(12) United States Patent
Masserang et al.

(10) Patent No.: US 8,910,733 B2
(45) Date of Patent: Dec. 16, 2014

(54) CHASSIS FOR A VEHICLE

(75) Inventors: Keith Masserang, Bloomfield Hills, MI (US); Joshua James Hicks, Clarkston, MI (US); Lawrence J. Lawson, Troy, MI (US); Barry Allan Clark, Ortonville, MI (US)

(73) Assignee: Android Industries LLC, Auburn Hills, MI (US)

( * ) Notice: Subject to any disclaimer, the term of this patent is extended or adjusted under 35 U.S.C. 154(b) by 159 days.

(21) Appl. No.: 13/370,990

(22) Filed: Feb. 10, 2012

(65) Prior Publication Data

US 2012/0205175 A1   Aug. 16, 2012

Related U.S. Application Data

(60) Provisional application No. 61/442,688, filed on Feb. 14, 2011, provisional application No. 61/522,536, filed on Aug. 11, 2011.

(51) Int. Cl.
| | | |
|---|---|---|
| *B62D 61/00* | (2006.01) | |
| *B60L 3/00* | (2006.01) | |
| *B60L 3/04* | (2006.01) | |
| *B62D 65/18* | (2006.01) | |
| *B60K 1/00* | (2006.01) | |

(52) U.S. Cl.
CPC ............. *B62D 65/18* (2013.01); *B60L 3/0007* (2013.01); *B60Y 2200/62* (2013.01); *B60L 3/04* (2013.01); *B60L 2200/46* (2013.01); *B60K 2001/001* (2013.01)
USPC ........................... 180/12; 180/8.5; 105/215.2

(58) Field of Classification Search
CPC ....... B62D 11/04; B60K 7/0007; B60L 13/00
USPC ................. 280/11, 12, 6.5, 2, 65.5, 7.1, 168; 105/215.2, 141
See application file for complete search history.

(56) References Cited

U.S. PATENT DOCUMENTS

| | | |
|---|---|---|
| 3,912,037 A | 10/1975 | Krieg |
| 4,044,853 A | 8/1977 | Melke |
| 6,208,916 B1 | 3/2001 | Hori |
| 6,278,905 B1 | 8/2001 | Saito |
| 6,378,883 B1 | 4/2002 | Epstein |
| 6,445,984 B1 | 9/2002 | Kellogg |
| 6,721,638 B2 | 4/2004 | Zeitler |
| 6,882,910 B2 | 4/2005 | Jeong |

(Continued)

FOREIGN PATENT DOCUMENTS

| | | |
|---|---|---|
| CN | 101459361 A | 6/2009 |
| EP | 0794104 A2 | 9/1997 |

(Continued)

OTHER PUBLICATIONS

International Search Report for Application No. PCT/US2012/024661 dated Sep. 12, 2012.

(Continued)

*Primary Examiner* — Tony Winner
(74) *Attorney, Agent, or Firm* — Honigman Miller Schwartz and Cohn LLP

(57) ABSTRACT

A chassis front assembly, a chassis rear assembly and a chassis intermediate assembly are disclosed. The chassis front assembly and the chassis rear assembly are connected to the chassis intermediate assembly for forming a chassis. A kit is also disclosed. A method is also disclosed.

25 Claims, 32 Drawing Sheets

(56) References Cited

U.S. PATENT DOCUMENTS

| | | |
|---|---|---|
| 6,904,343 B2 | 6/2005 | Kang |
| 7,011,487 B2 | 3/2006 | Kafka et al. |
| 7,044,703 B2 | 5/2006 | Fukuda et al. |
| 7,090,042 B2 | 8/2006 | Coveyou et al. |
| 7,178,660 B2 | 2/2007 | Dehne et al. |
| 7,350,613 B2 | 4/2008 | Dehne |
| 7,362,066 B2 | 4/2008 | Emond |
| 7,400,486 B2 | 7/2008 | Stewart |
| RE41,077 E | 1/2010 | Marino et al. |
| 7,648,329 B2 | 1/2010 | Chilson et al. |
| 2004/0251870 A1 | 12/2004 | Ueda et al. |
| 2006/0169415 A1 | 8/2006 | Lawson et al. |
| 2006/0276958 A1 | 12/2006 | Crumbaugh |
| 2009/0234488 A1 | 9/2009 | Kilibarda |
| 2010/0078232 A1 | 4/2010 | Adachi |
| 2010/0266381 A1 | 10/2010 | Chilson et al. |

FOREIGN PATENT DOCUMENTS

| | | |
|---|---|---|
| EP | 0821297 A1 | 1/1998 |
| EP | 1537036 A1 | 6/2005 |
| JP | 10203362 A | 8/1998 |
| JP | 2003002190 A | 1/2003 |
| JP | 2008296900 A | 12/2008 |
| KR | 200329213 Y1 | 10/2003 |
| KR | 100690019 B1 | 2/2007 |
| WO | WO-2010140321 A1 | 12/2010 |

OTHER PUBLICATIONS

European Search Report for related Application No. 12747084.7 dated Jul. 14, 2014.

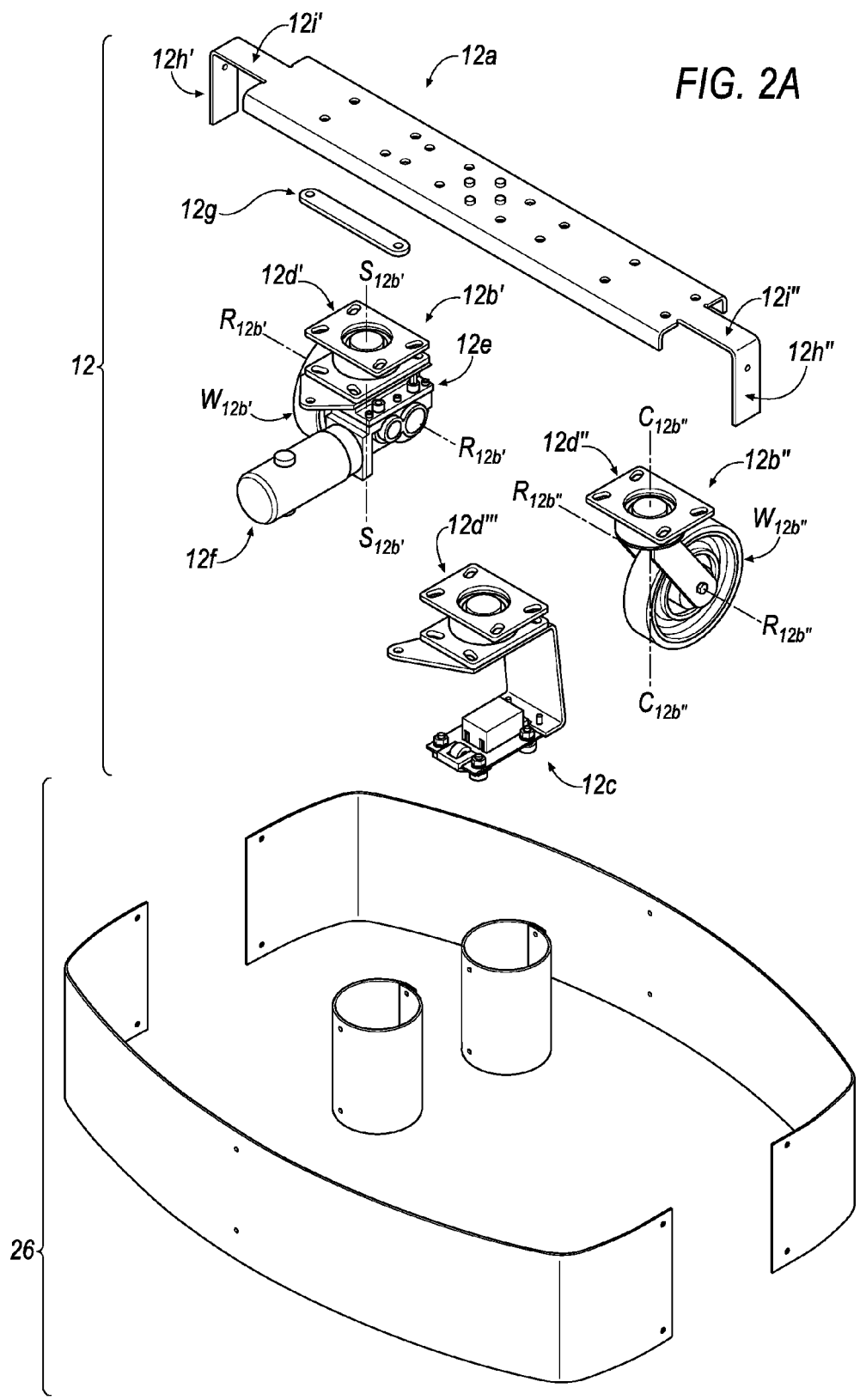

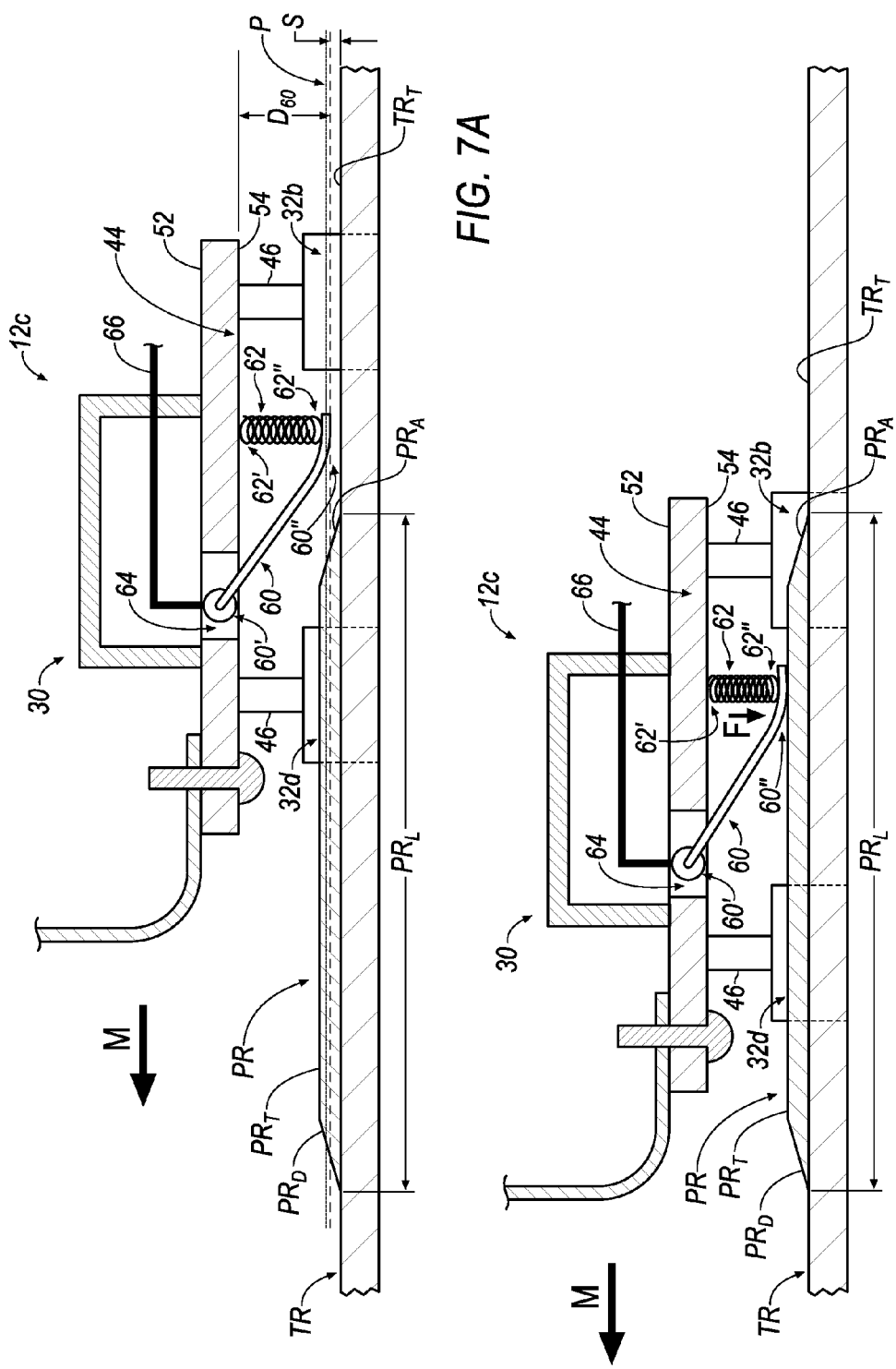

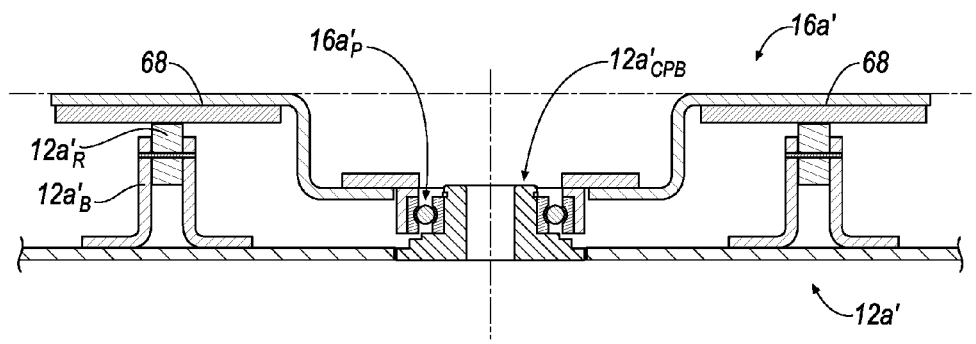
FIG. 12
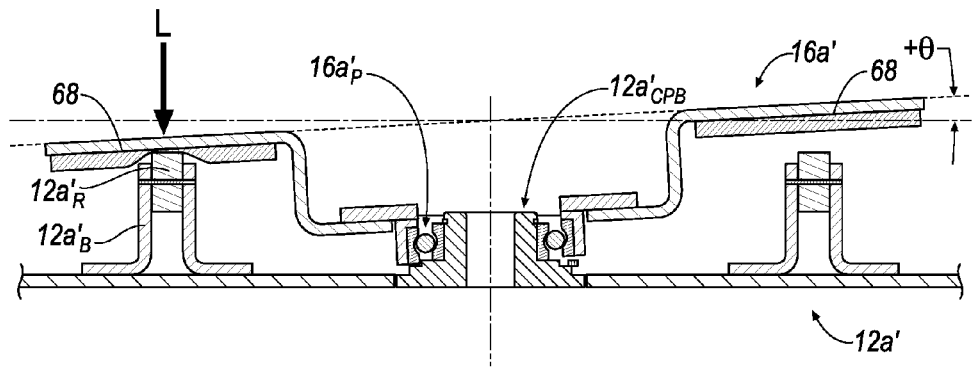
FIG. 12'
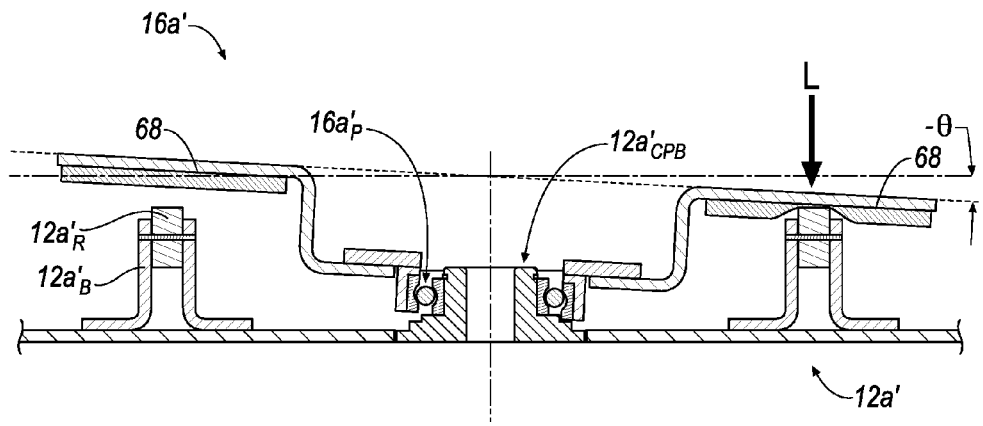
FIG. 12"

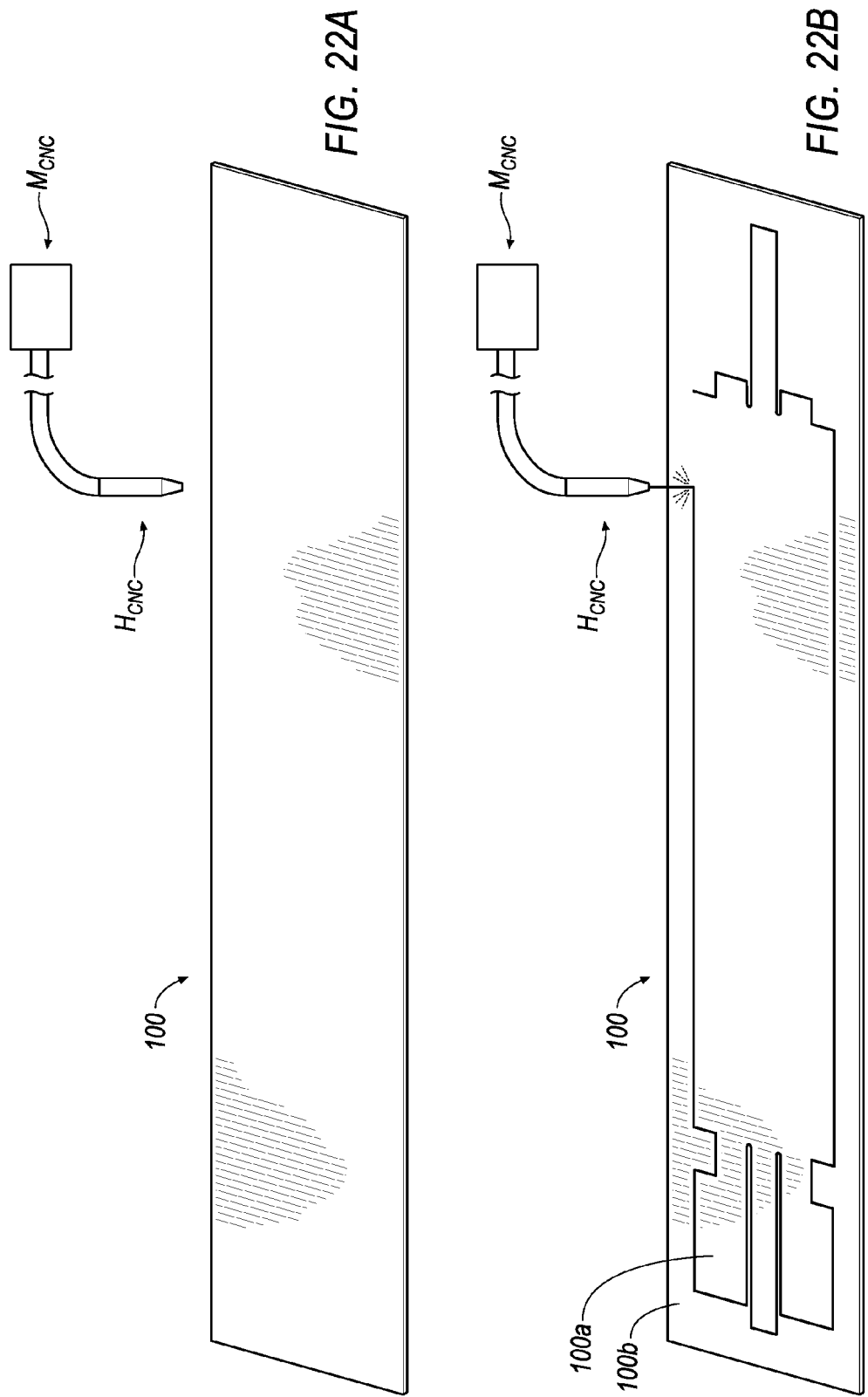

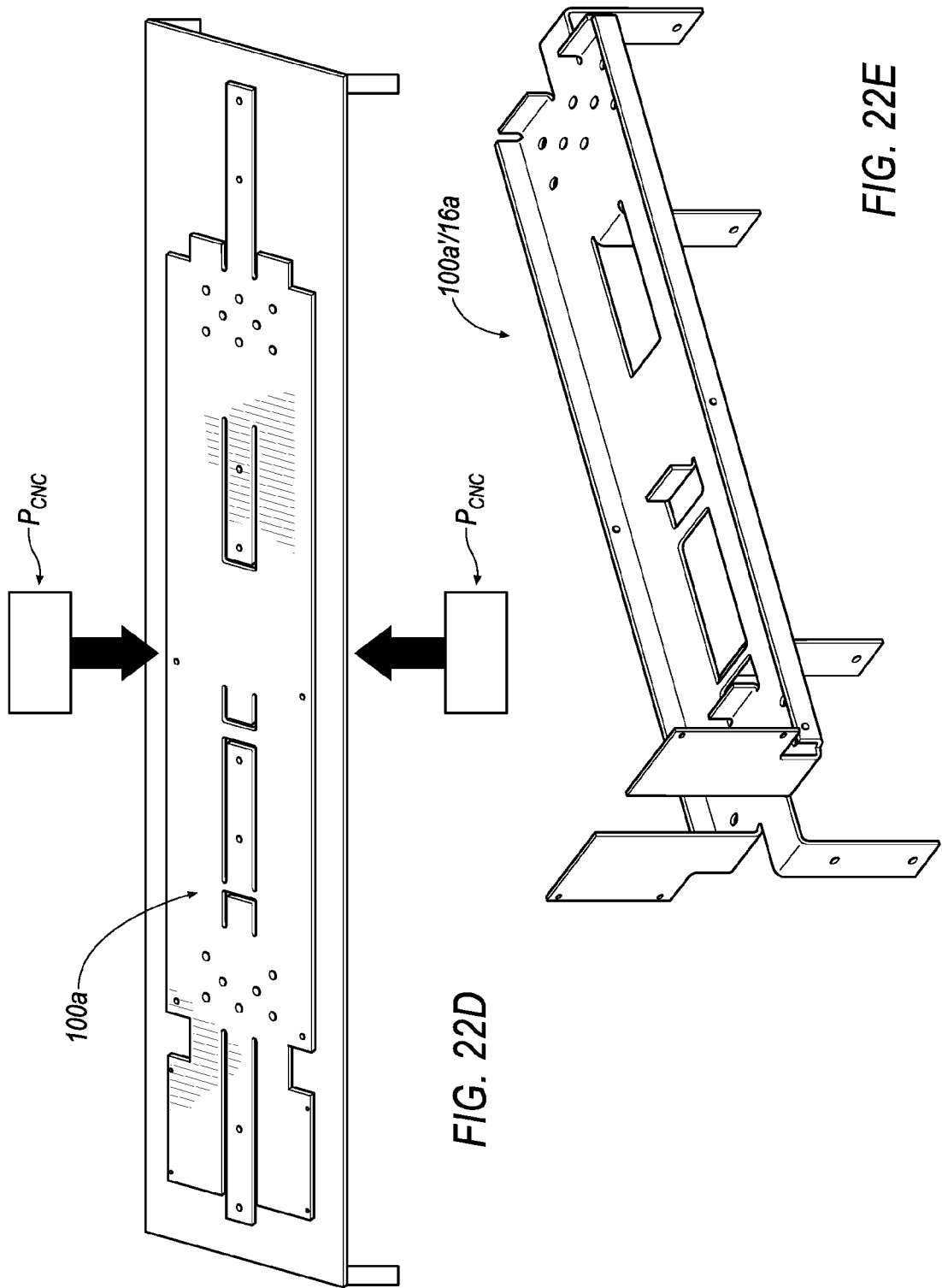

CHASSIS FOR A VEHICLE

CROSS-REFERENCE TO RELATED APPLICATIONS

This U.S. patent application claims priority to U.S. Provisional Application 61/442,688, filed on Feb. 14, 2011 and U.S. Provisional Application 61/522,536 filed on Aug. 11, 2011, the disclosures of which are considered part of the disclosure of this application and are hereby incorporated by reference in its entirety.

FIELD OF THE INVENTION

The disclosure relates to a chassis including a chassis front assembly, a chassis rear assembly and a chassis intermediate assembly.

DESCRIPTION OF THE RELATED ART

It is known in the assembling arts that a work product is processed in several steps. Usually, conventional methodologies that conduct such steps require a significant capital investment and human oversight. The present invention overcomes drawbacks associated with the prior art by setting forth a device utilized for processing a work product.

BRIEF DESCRIPTION OF THE DRAWINGS

The disclosure will now be described, by way of example, with reference to the accompanying drawings, in which:

FIG. 2A illustrates an exploded, perspective view of a front assembly of the chassis in accordance with an exemplary embodiment of the invention.

FIGS. 7A and 7B are partial cross-sectional views according to line 7-7 of FIG. 6B in accordance with an exemplary embodiment of the invention.

FIG. 12 is an enlarged view of a portion of the chassis according to line 12 of FIG. 11 in accordance with an exemplary embodiment of the invention.

FIGS. 12' and 12" are manipulated orientations of the chassis of FIG. 12 in accordance with an exemplary embodiment of the invention.

FIG. 22A illustrates a material blank in accordance with an exemplary embodiment of the invention.

FIG. 22B illustrates a cutting device that cuts the material blank of FIG. 22A in accordance with an exemplary embodiment of the invention.

FIG. 22D illustrates the non-scrap portion of the material blank disposed upon a press in accordance with an exemplary embodiment of the invention.

FIG. 22E illustrates a component of FIGS. 4A-4B derived from the non-scrap portion after being spatially manipulated by the press of FIG. 22D.

DETAILED DESCRIPTION OF THE INVENTION

The Figures illustrate an exemplary embodiment of a chassis including a chassis front assembly, a chassis rear assembly and a chassis intermediate assembly in accordance with an embodiment of the invention. Based on the foregoing, it is to be generally understood that the nomenclature used herein is simply for convenience and the terms used to describe the invention should be given the broadest meaning by one of ordinary skill in the art.

Figure 1:
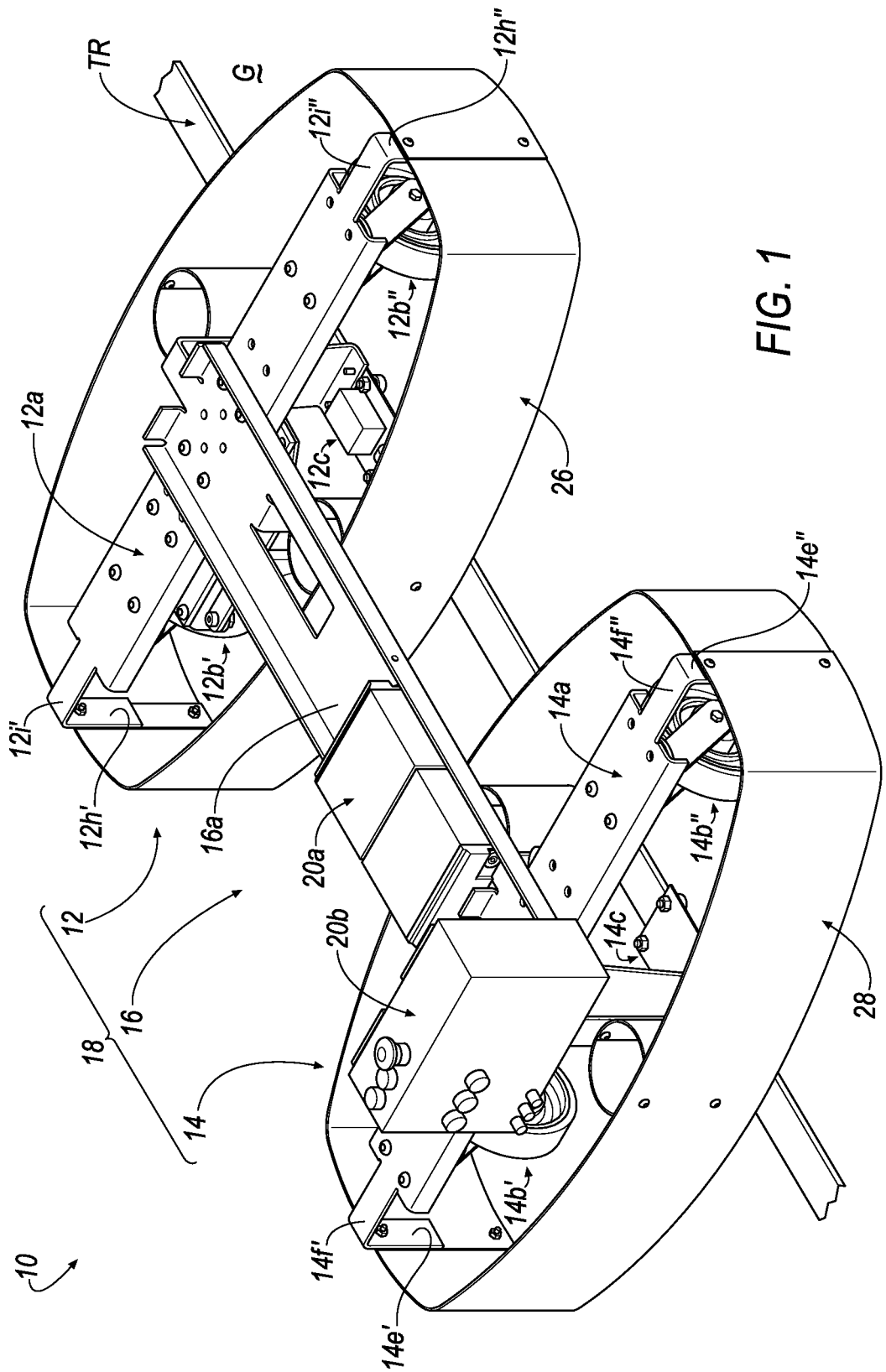
FIG. 1 illustrates an assembled perspective view of a chassis in accordance with an exemplary embodiment of the invention.

A chassis is shown generally at 10 in FIG. 1 according to an embodiment. The chassis 10 may be a component of/be attached to a cart 1 (see, e.g., FIG. 24).

Figure 24:
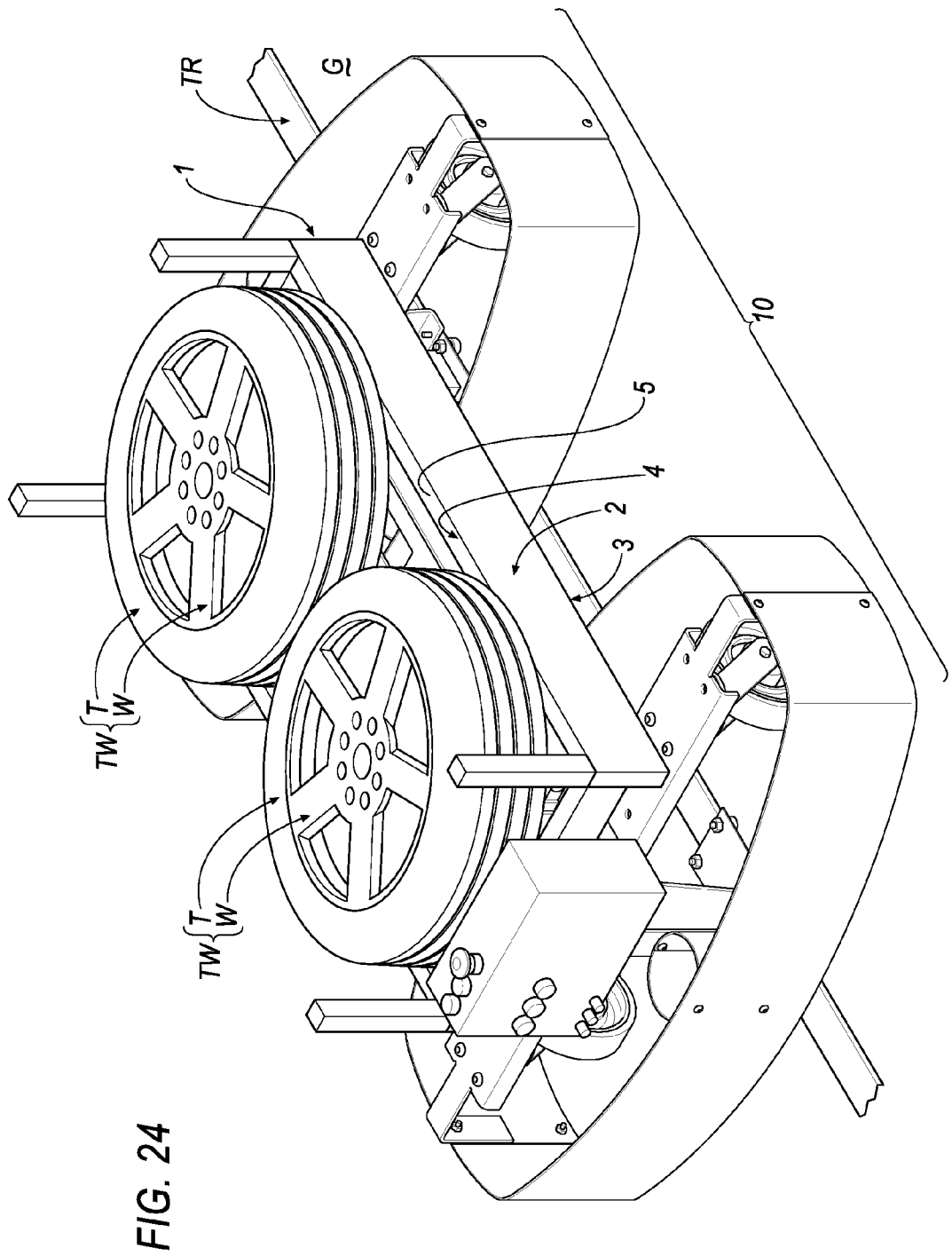
FIG. 24 illustrates a cart attached to and supported by the chassis of FIG. 1 in accordance with an exemplary embodiment of the invention.

Referring to FIG. 24, the cart 1 may include a body 2 having a lower end 3 and an upper end 4. The chassis 10 is connected to the lower end 3 of the body 2. The upper end 4 forms a work product support surface 5.

Figure 25:
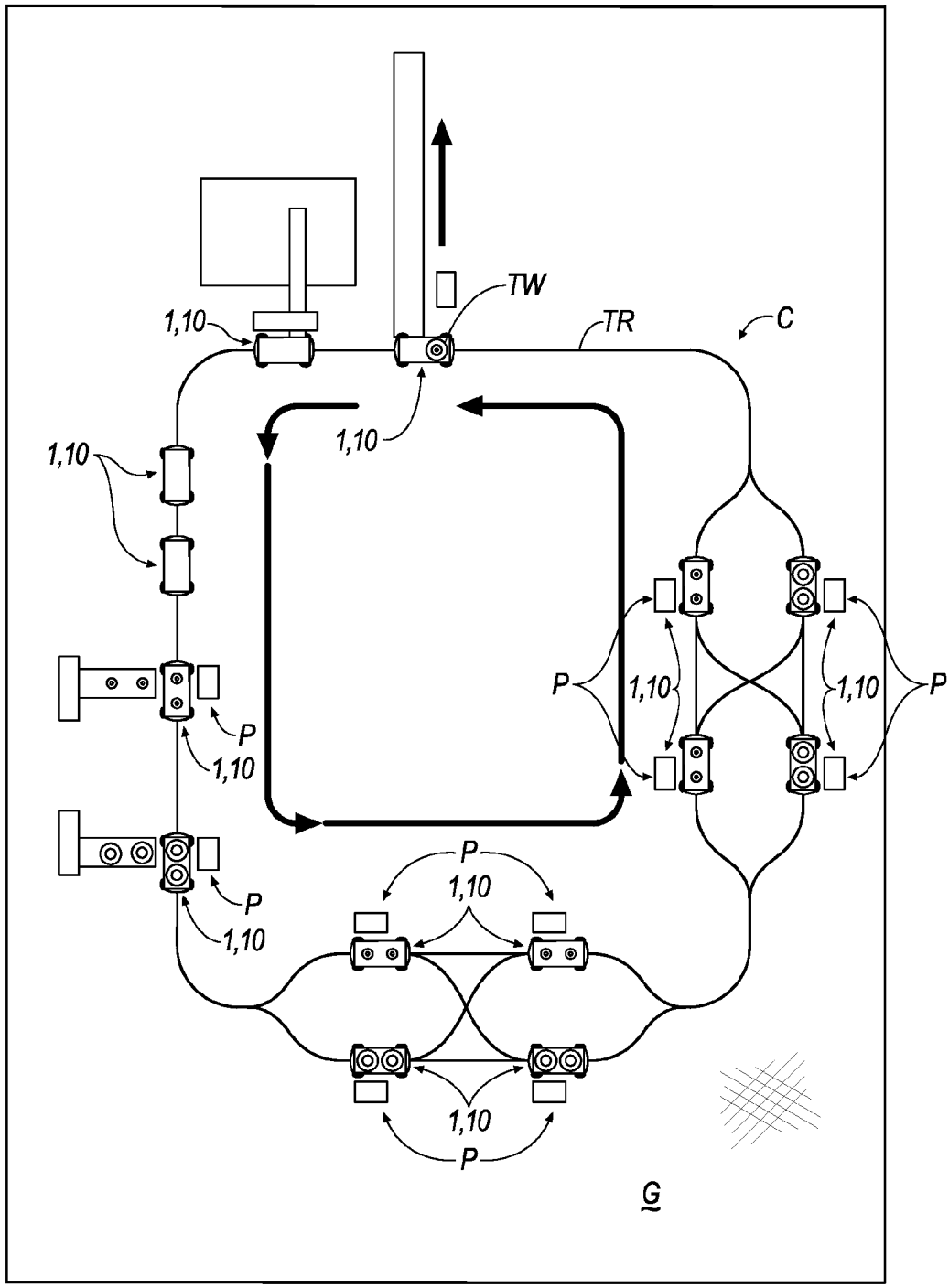
FIG. 25 illustrates the cart of FIG. 24 interfaced with a track member forming a course that traverses one or more processing stations that are utilized to process a work product.

The chassis 10 may movably-support the cart 1 such that the cart 1 may be moved, M, relative a track, TR (see also, e.g., FIG. 25). In an embodiment, as seen and described in the following disclosure at FIGS. 6B-7B, the chassis 10 may be directly-coupled to/be at least partially electrically-coupled to the track, TR. The track, TR, may be affixed to an underlying ground surface, G (see, e.g., FIG. 25), that generally forms a course, C (see, e.g., FIG. 25). The course, C, may sequentially guide the cart 1 to one or more processing stations, P (see, e.g., FIG. 25), that are utilized to process a work product.

Referring to FIG. 24, the work product may include one or more components that are supportably-arranged upon the work product support surface 5. The one or more components may include any desirable components that form any desirable work product. In an implementation, the one or more components may include, for example, a tire, T, and a wheel, W.

Referring to FIG. 25, when the cart 1 moves along/traverses the course, C, the cart 1 may traverse/come to a stop at the one or more processing stations, P, in order permit the one or more processing stations, P, to conduct a processing step upon or more of the tire, T, and the wheel, W, in order to ultimately form, for example, a tire-wheel assembly, TW (see, e.g., FIG. 24). The one or more processing steps conducted by the one or more processing stations, P, for forming the tire-wheel assembly, TW, may include, but is not limited to, for example: a tire soaping step, a mounting step, an inflating step and a balancing step; accordingly, the one or more processing stations, P, may include, but is not limited to, for example, a tire soaping station, a mounting station, an inflating station and a balancing station.

Figure 2B:
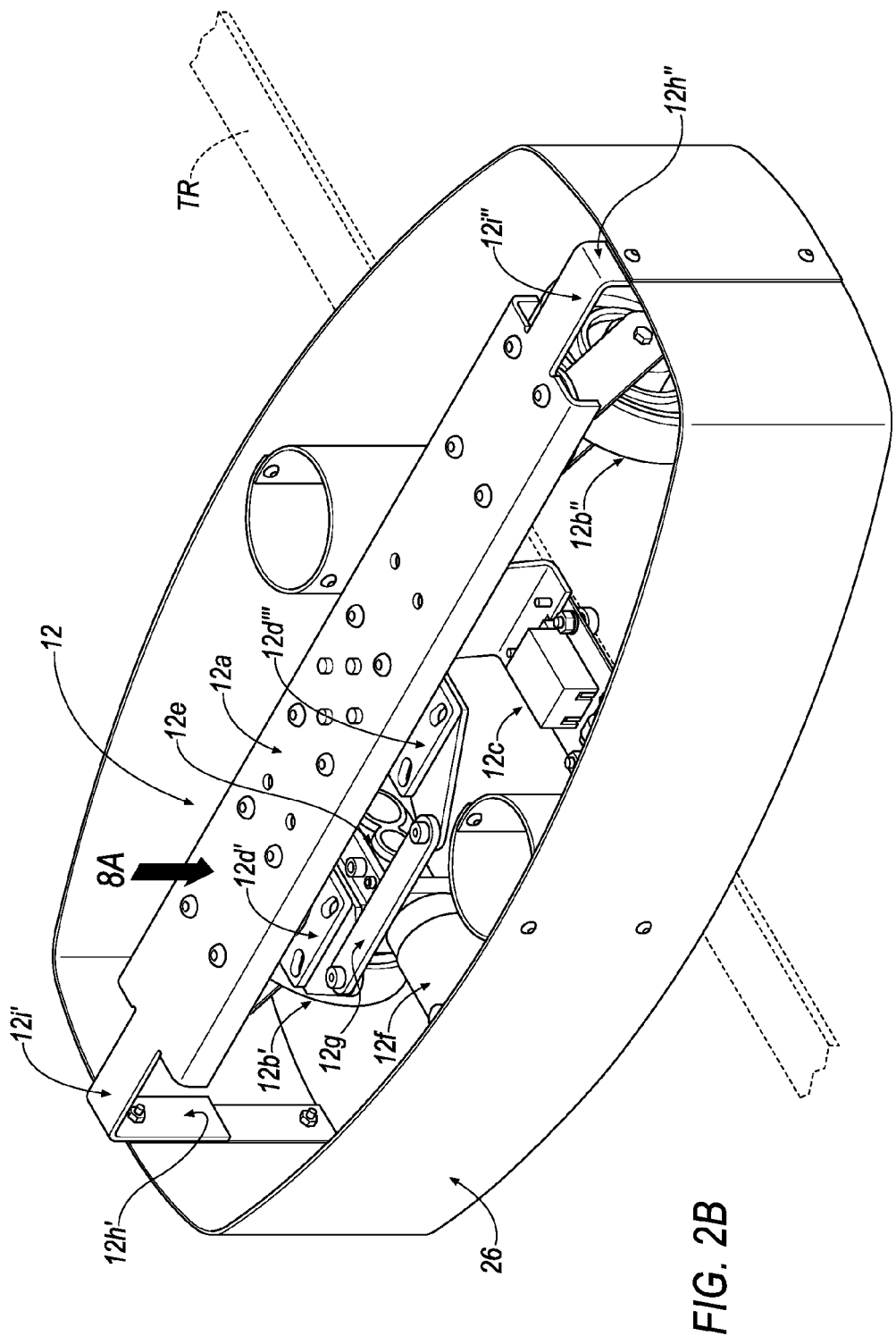
FIG. 2B illustrates an assembled, perspective view of the front assembly of FIG. 2A.
Figure 3A:
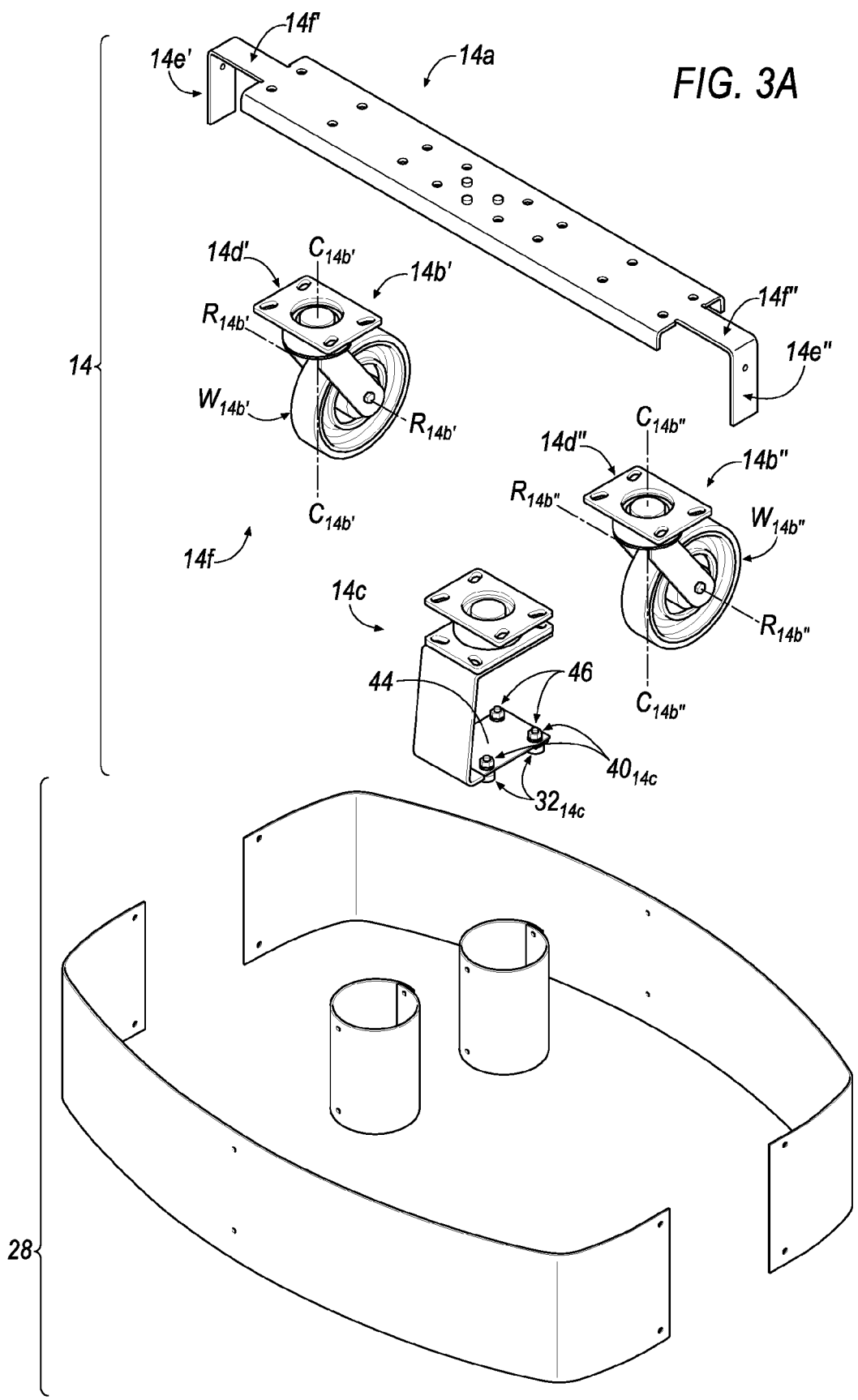
FIG. 3A illustrates an exploded, perspective view of a rear assembly of the chassis in accordance with an exemplary embodiment of the invention.
Figure 3B:
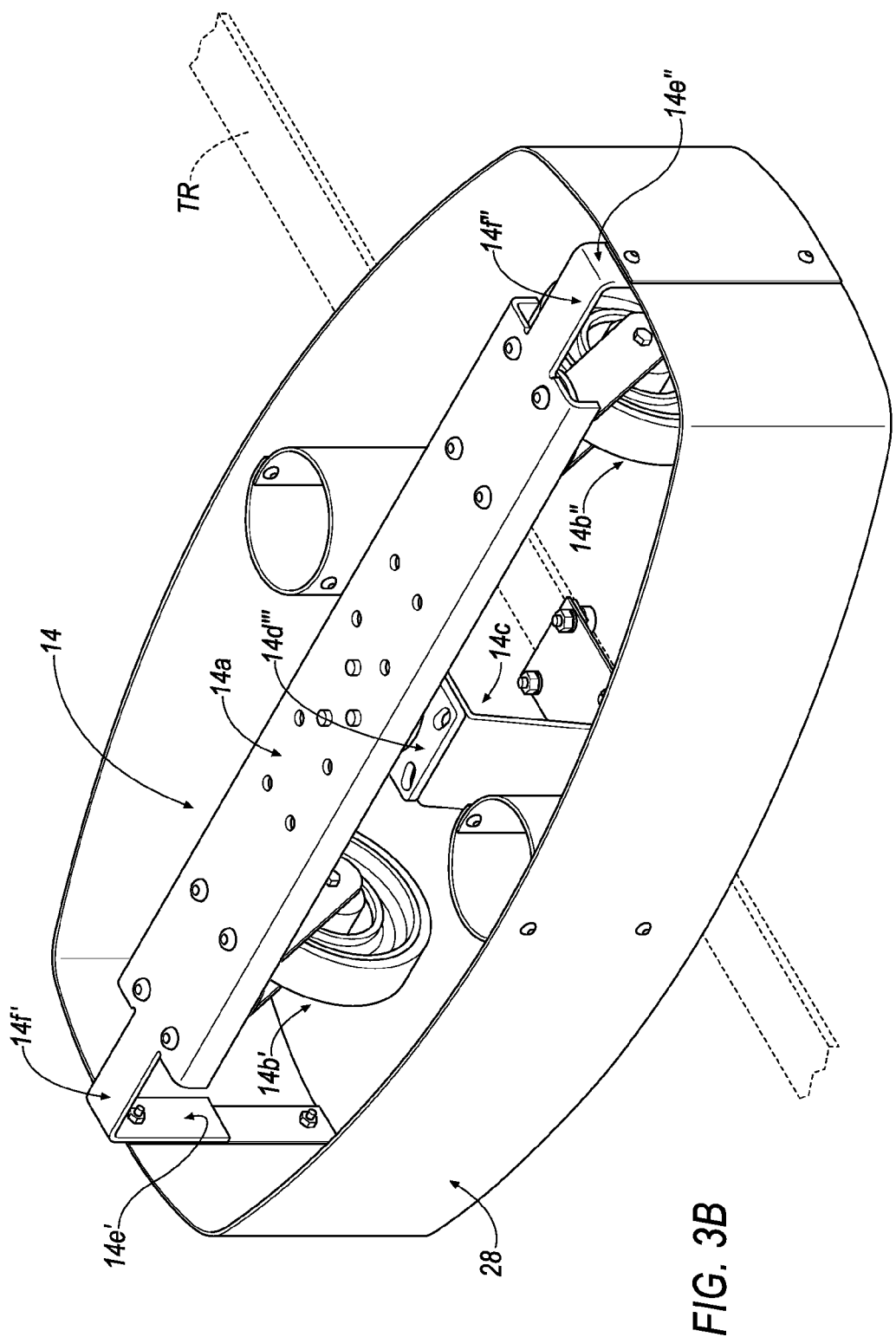
FIG. 3B illustrates an assembled, perspective view of the rear assembly of FIG. 3A.
Figure 5A:
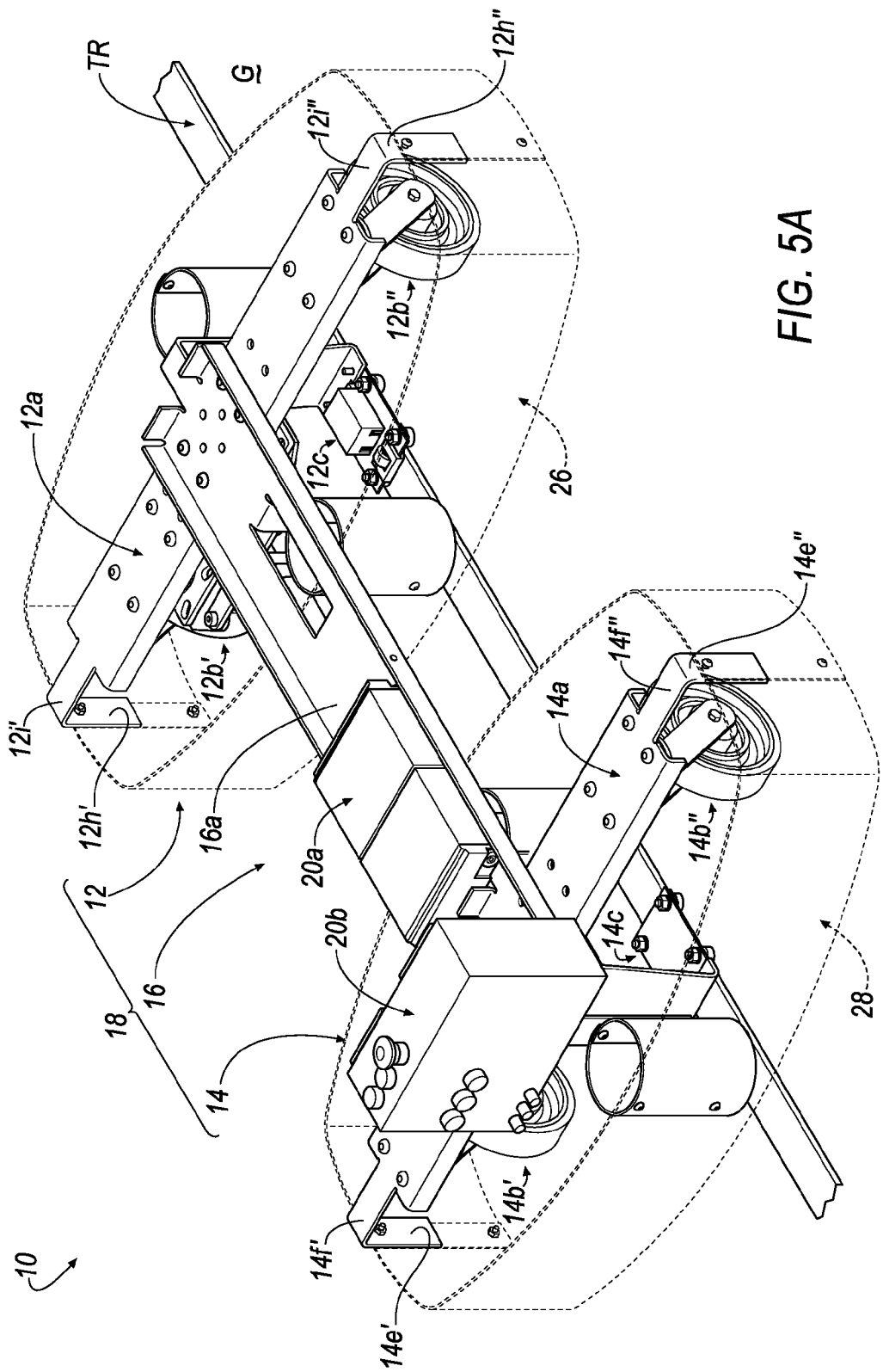
FIG. 5A illustrates an assembled perspective view of the chassis of FIG. 1 that includes a sub-assembly formed by the front assembly of FIGS. 2A-2B, the rear assembly of FIGS. 3A-3B and the base frame member and first and second enclosures of FIGS. 4A-4B.

Referring to FIG. 1, the chassis 10 includes a front assembly 12 (see also, e.g., FIGS. 2A-2B) and a rear assembly 14 (see also, e.g., FIGS. 3A-3B). The front assembly 12 is connected to the rear assembly 14 by a base frame member 16a (see also, e.g., FIGS. 1 and 5A). As will be described in the following disclosure, the front assembly 12 may be utilized to steer the chassis 10 as the chassis 10 moves, M, along the track, TR.

Referring to FIGS. 2A-2B, the front assembly 12 is shown according to an embodiment. The front assembly 12 includes a front frame member 12a, a first wheel assembly 12b' connected to the front frame member 12a, a second wheel assembly 12b" connected to the front frame member 12a and an electrical contact assembly 12c connected to the front frame member 12a. The first wheel assembly 12b', the second wheel assembly 12b" and the electrical contact assembly 12c may be connected to the front frame member 12a with any desirable fastener, such as, for example, a threaded bolt, washer and nut, TWN (see, e.g., FIG. 23A); alternatively, the first wheel assembly 12b', the second wheel assembly 12b" and the electrical contact assembly 12c may be connected to the front frame member 12a by way of, for example, a welded connection.

Referring to FIG. 2A, each of the first and second wheel assemblies 12b', 12b" include a wheel, $W_{12b'}$, $W_{12b''}$, that is connected to a bracket 12d', 12d". The bracket 12d' 12d" of each of the first and second wheel assemblies 12b', 12b" is connected to the front frame member 12a.

The wheel, $W_{12b'}$, of the first wheel assembly 12b' includes an axis of rotation, $R_{12b'}$-$R_{12b'}$, that is pivotably-adjustable about a steering axis, $S_{12b'}$-$S_{12b'}$, that is orthogonal to the axis of rotation, $R_{12b'}$-$R_{12b'}$, of the first wheel assembly 12b'. The wheel, $W_{12b''}$, of the second wheel assembly 12b" may be a caster wheel and includes an axis of rotation, $R_{12b''}$-$R_{12b''}$, that is adjustable (i.e., wheel, $W_{12b''}$, is permitted to caster, CA, as seen in FIG. 8B) about a castering axis, $C_{12b''}$-$C_{12b''}$, that is orthogonal to the axis of rotation, $R_{12b''}$-$R_{12b''}$, of the second wheel assembly 12b".

The bracket 12d' of the first wheel assembly 12b' may include/be connected to a housing 12e that supports a motor 12f. The motor 12f drives rotation of the wheel, $W_{12b'}$, of the first wheel assembly 12b' about the axis of rotation, $R_{12b'}$-$R_{12b'}$.

The motor 12f receives power from the track, TR; the motor 12f may be, for example, connected to a conduit 66 (see, e.g., FIG. 5B-7B) that is connected to the electrical contact assembly 12c that is connected to the track, TR. As will be described in greater detail in the following disclosure at FIGS. 8A-8B, the first wheel assembly 12b' is connected to the electrical contact assembly 12c by way of a drag link 12g that pivotably urges/rotates in one of a clock-wise direction, CW (see, e.g., FIG. 8B), or a counter-clockwise direction the first wheel assembly 12b' about the steering axis, $S_{12b'}$-$S_{12b'}$, by way of a steering force, P (see, e.g., FIG. 8B).

Referring to FIGS. 3A-3B, the rear assembly 14 is shown according to an embodiment. The rear assembly 14 includes a rear frame member 14a, a first wheel assembly 14b' connected to the rear frame member 14a, a second wheel assembly 14b" connected to the rear frame member 14a and a track guide assembly 14c connected to the rear frame member 14a. The first wheel assembly 14b', the second wheel assembly 14b" and the track guide assembly 14c may be connected to the rear frame member 14a with any desirable fastener, such as, for example, a threaded bolt, washer and nut, TWN (see, e.g., FIG. 23A); alternatively, the first wheel assembly 14b', the second wheel assembly 14b" and the track guide assembly 14c may be connected to the rear frame member 14a by way of, for example, a welded connection.

Referring to FIG. 3A, each of the first and second wheel assemblies 14b', 14b" include a wheel, $W_{14b'}$, $W_{14b''}$, that is connected to a bracket 14d', 14d". The bracket 14d' 14d" of each of the first and second wheel assemblies 14b', 14b" is connected to the rear frame member 14a.

The wheel, $W_{14b'}$, of the first wheel assembly 14b' may be a caster wheel and includes an axis of rotation, $R_{14b'}$-$R_{14b'}$, that is adjustable (i.e., wheel, $W_{14b'}$, is permitted to caster) about a castering axis, $C_{14b'}$-$C_{14b'}$, that is orthogonal to the axis of rotation, $R_{14b'}$-$R_{14b'}$, of the first wheel assembly 14b'. The wheel, $W_{14b''}$, of the second wheel assembly 14b" may be a caster wheel and includes an axis of rotation, $R_{14b''}$-$R_{14b''}$, that is adjustable (i.e., wheel, $W_{14b''}$, is permitted to caster) about a castering axis, $C_{14b''}$-$C_{14b''}$, that is orthogonal to the axis of rotation, $R_{14b''}$-$R_{14b''}$, of the second wheel assembly 14b".

Figure 4A:
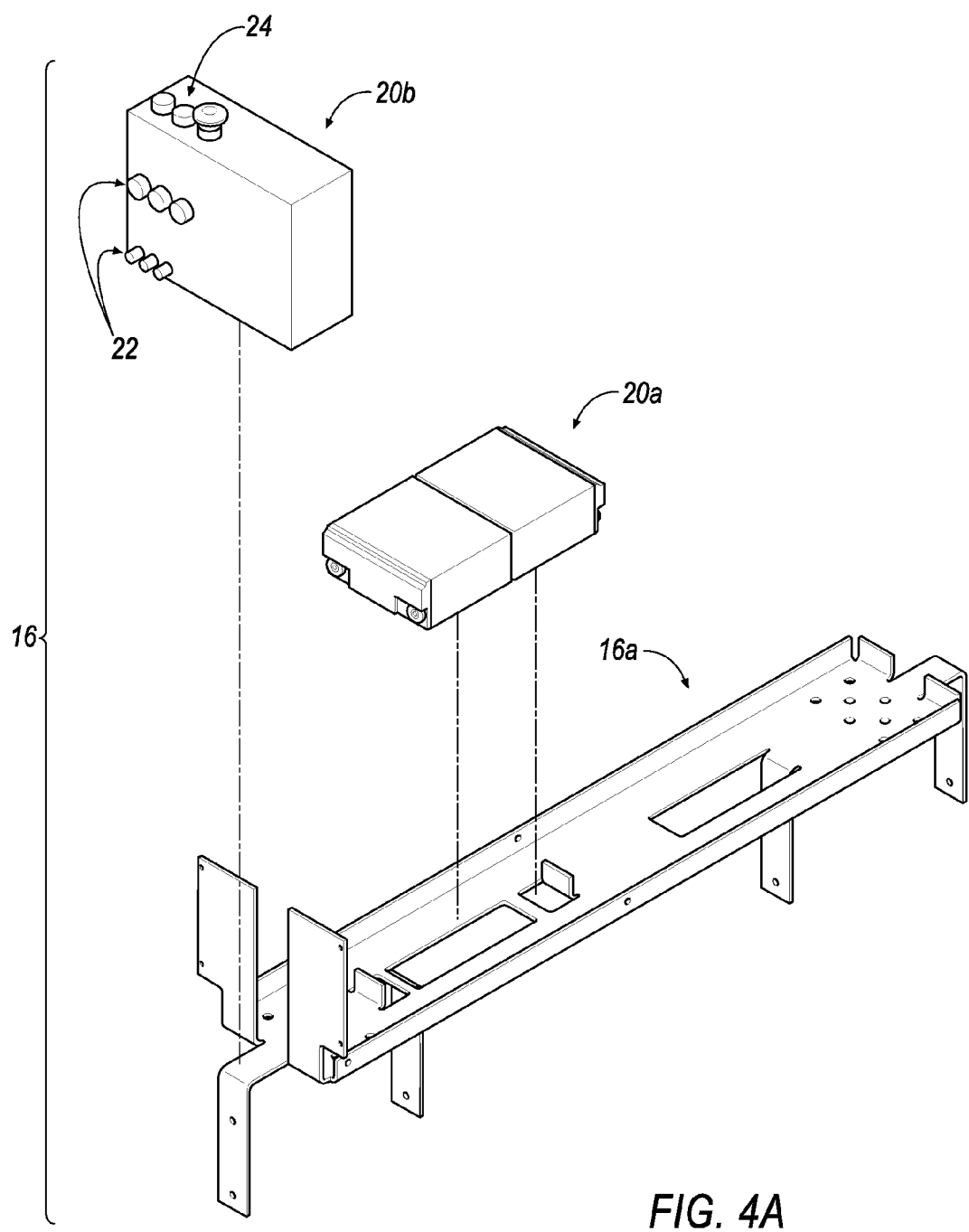
FIG. 4A illustrates an exploded, perspective view of a base frame member and first and second enclosures in accordance with an exemplary embodiment of the invention.
Figure 4B:
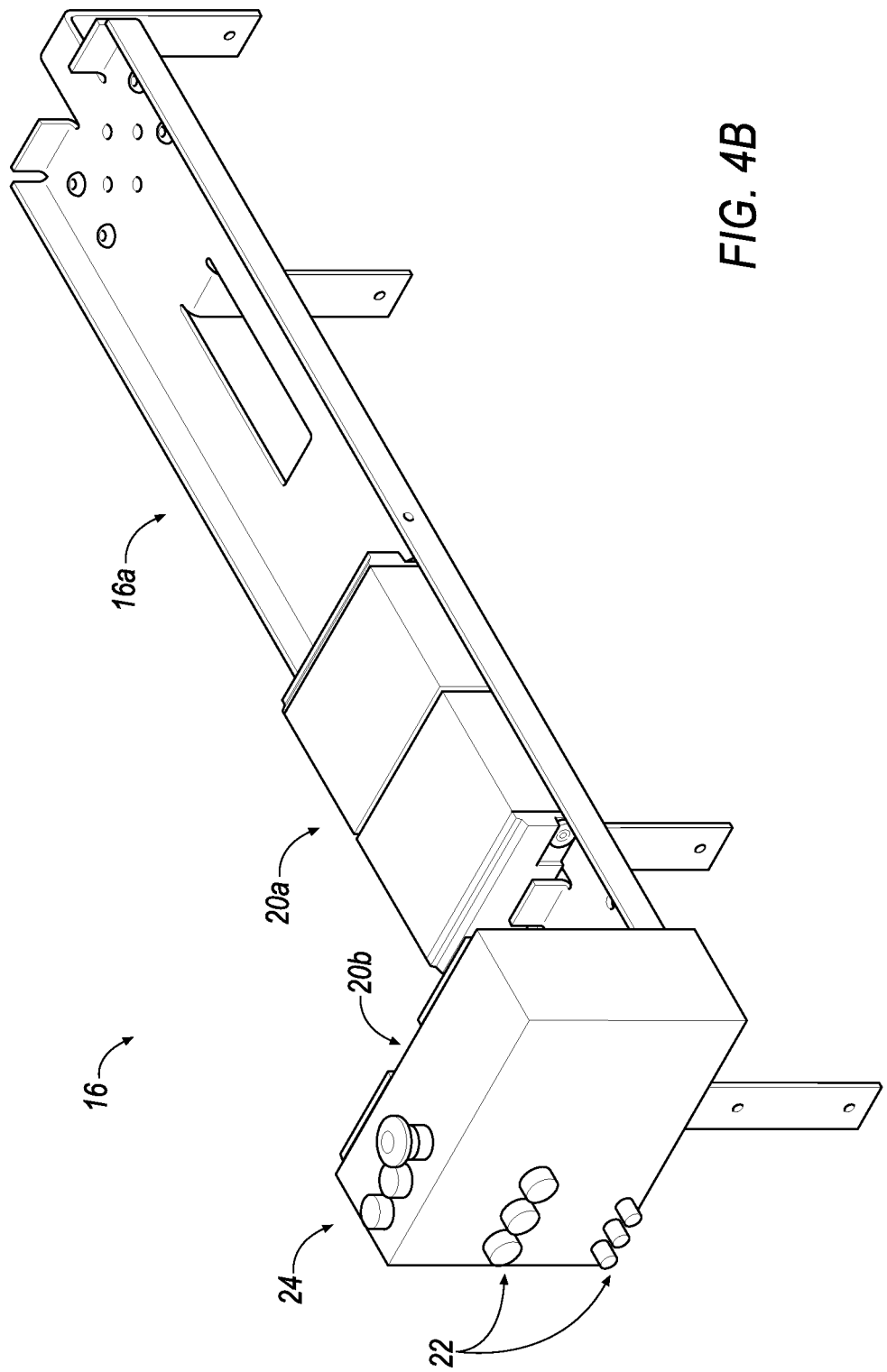
FIG. 4B illustrates an assembled, perspective view of the base frame member and the first and second enclosures of FIG. 4A.

Referring to FIGS. 4A-4B, an intermediate assembly is shown generally at 16. The intermediate assembly 16 includes at least a base frame member 16a. A sub-assembly 18 (see, e.g., FIGS. 1 and 5A) is formed upon connection of the front assembly 12 to the rear assembly 14 by the base frame member 16a of the intermediate assembly 16. The front and rear assemblies 12, 14 may be connected to the intermediate frame member 16a with any desirable fastener, such as, for example, a threaded bolt, washer and nut, TWN (see, e.g., FIG. 23A); alternatively, the front and rear assemblies 12, 14 may be connected to the intermediate frame member 16a by way of, for example, a welded connection.

The base frame member 16a may be connected to and support a first enclosure 20a and a second enclosure 20b. Each of the first and second enclosures 20a, 20b may contain a circuit board including electronics. The electronics of the first enclosure 20a may include, for example: a controller, a battery that stores power and the like. The electronics of the second enclosure 20b may include electronics that are communicatively coupled to a plurality of status indicators 22 (e.g., light emitting diodes), user input switches 24 (e.g., ON/OFF switches) and the like. As will be described in greater detail in the following disclosure at FIG. 5B, electronics of the first and second enclosures 20a, 20b may be communicatively-coupled to one another, and, also, may be arranged in electrical communication with the electrical contact assembly 12c by way of, for example, the conduit 66.

Referring to FIGS. 2A-2B, a front assembly shield is shown generally at 26, and, referring to FIGS. 3A-3B, a rear assembly shield is shown generally at 28. Each of the front and rear assembly shields 26, 28 may include a length of material that may be bent in order to form a substantially oval geometry. Functionally, each of the front and rear assembly shields 26, 28 prevent foreign objects, FO (see, e.g., FIGS. 19A-19B, 20A-20B), from coming into direct contact with one or more components that form the front assembly 12 and the rear assembly 14.

The front assembly shield 26 may be connected to lateral side flanges 12h', 12h" that extend substantially perpendicularly away front opposing end members 12i', 12i" of the front frame member 12a. The rear assembly shield 28 may be connected to lateral side flanges 14e', 14e" that extend away front opposing side surfaces 14f', 14f" of the rear frame member 14a. The front assembly shield 26 may be considered to be a component of the front assembly 12, and, the rear assembly shield 28 may be considered to be a component of the rear assembly 14.

Figure 5B:
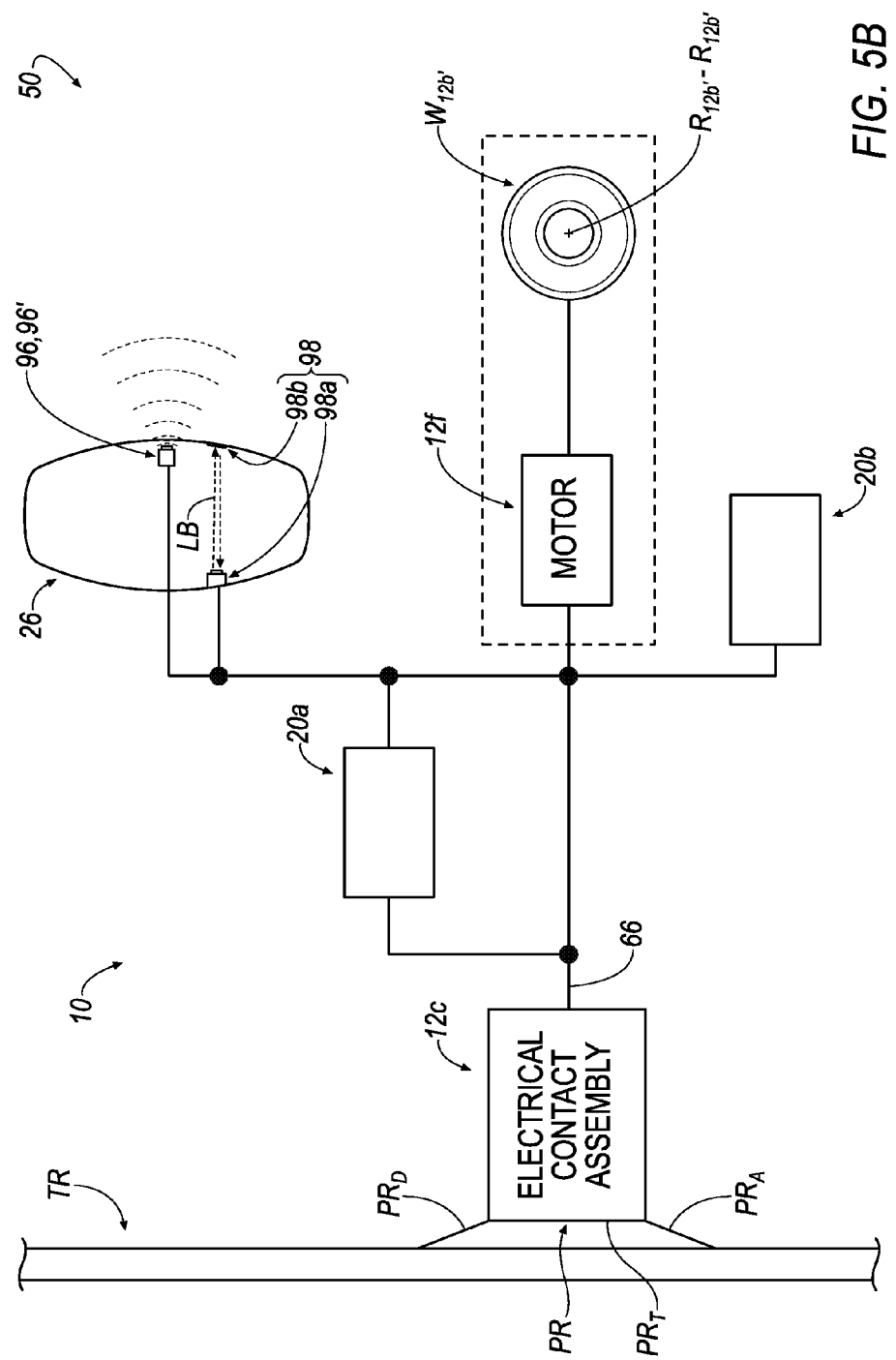
FIG. 5B illustrates a circuit diagram of the chassis of FIGS. 1 and 5A.

Referring to FIG. 5B, an electro-mechanical circuit diagram 50 of some components of the chassis 10 is shown according to an embodiment. As discussed above, the chassis 10 may move along the track, TR; the track, TR, may continuously, or, periodically include power rails, PR, that act as a power source for the chassis 10 when the electrical contact assembly 12c is in communication (e.g., in direct communication or in indirect communication) with the power rails, PR, such that the power rails, PR, may be said to be in electrical communication with the chassis 10.

If, for example, the power rails, PR, are continuous with the track, TR, the power rails, PR, may continuously provide power to the chassis 10. However, if, for example, the power rails, PR, are periodically provided along the track, TR (as seen in, e.g., FIG. 5B), the power rails, PR, may periodically provide power to the chassis 10.

In an embodiment, one or more of the first and second enclosures 20a, 20b may include a battery that stores power. In an embodiment, when the chassis 10 is in electrical communication with the power rails, PR, the power rails, PR, may charge the battery.

In an embodiment, upon contact of the power rails, PR, with the electrical contact assembly 12c, a controller disposed within, for example, the first enclosure 20a may operate one or more components of the chassis 10. For example, the controller may activate the motor 12f, which may be driven by: 1) power from the battery, or, alternatively, 2) from power directly obtained by the power rails, PR. The output of the motor 12f may be utilized to drive rotation of the wheel, $W_{12b'}$, of the first wheel assembly 12b' about the axis of rotation, $R_{12b'}$-$R_{12b'}$; in an embodiment, because the wheel, $W_{12b'}$, of the first wheel assembly 12b' is driven directly by the motor 12f, the wheel, $W_{12b'}$, of the first wheel assembly 12b' may be referred to as an "active" wheel whereas, conversely, because the caster wheels, $W_{12b''}$, $W_{14b'}$, $W_{14b''}$, are not directly connected to the motor 12f, the caster wheels, $W_{12b''}$, $W_{14b'}$, $W_{14b''}$, may be referred to as "passive" wheels.

Referring to FIGS. 6A-7B, the electrical contact assembly 12c is described according to an embodiment. The electrical contact assembly 12c includes a bracket 12d''', a junction box 30, a plurality of track side rollers $32_{12c}$, a track top roller 34, a track top roller bracket 36, a top track roller pin 38, a plurality of track roller fasteners $40_{12c}$ and a plurality of base plate fasteners 42.

Figure 6A:
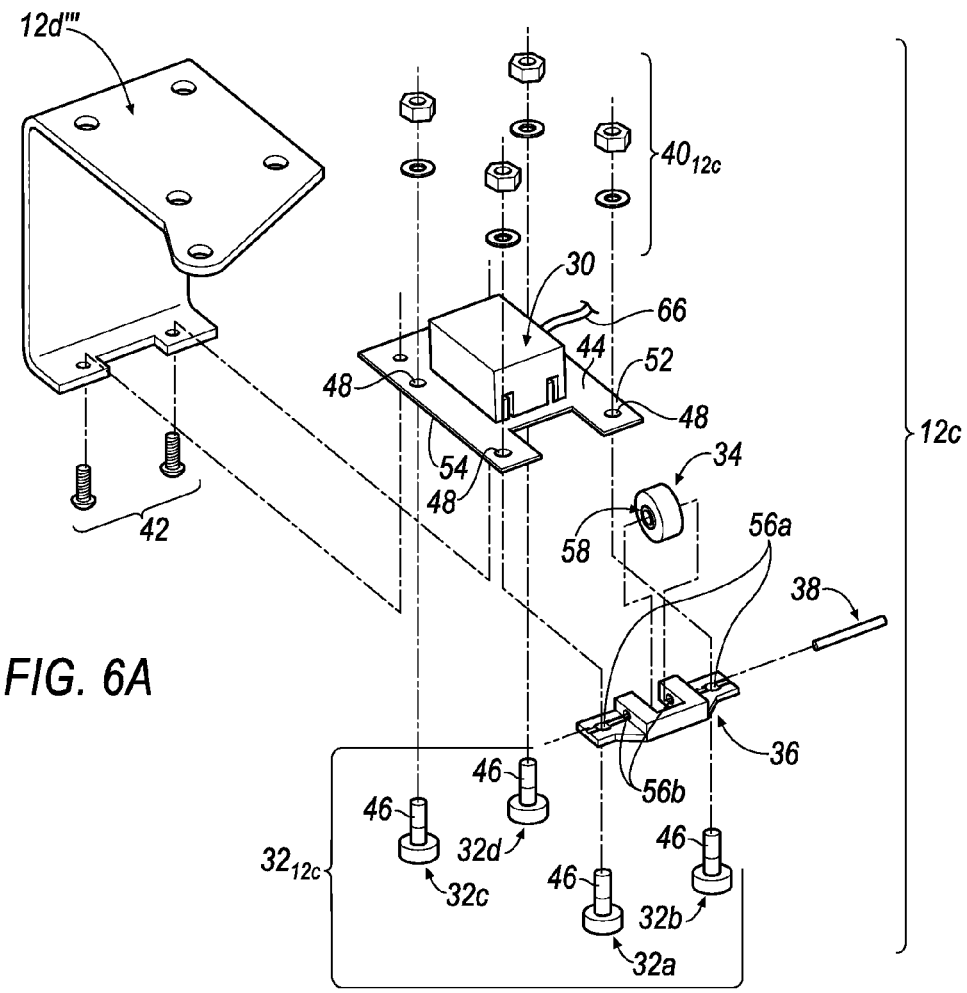
FIG. 6A illustrates an exploded perspective view of a bracket member and electrical contact device in accordance with an exemplary embodiment of the invention.
Figure 6B:
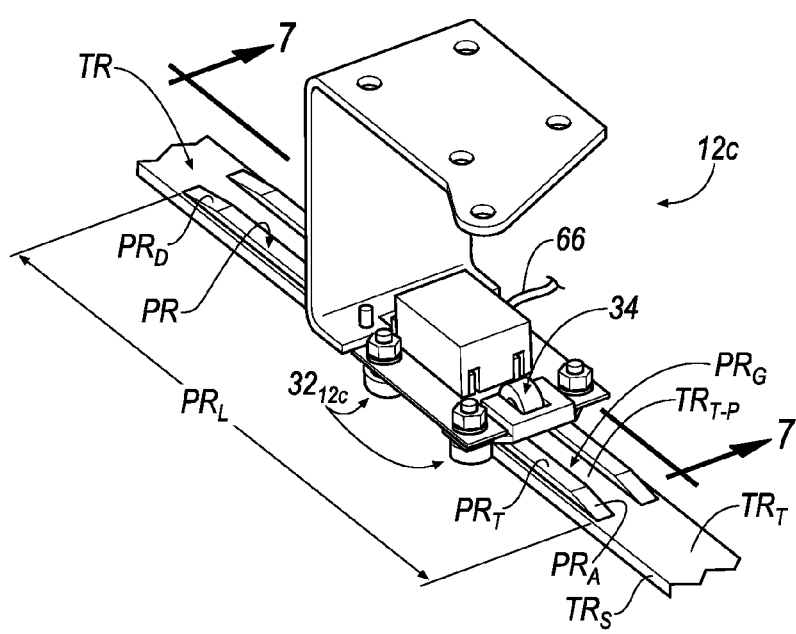
FIG. 6B illustrates an assembled perspective view of the bracket member and electrical contact device of FIG. 6A disposed upon a track member including power rails in accordance with an exemplary embodiment of the invention.

The bracket 12d''' may be attached to the front frame member 12a (as seen in, e.g., FIGS. 2A-2B); however, it should be noted that the view of FIGS. 6A-6B shows, in an embodiment, a non-pivoting/lower portion of the bracket 12d''' (as will be described in FIGS. 8A-8B in the following disclosure, a portion (i.e., an upper portion) of the bracket 12d''' may act as a bearing portion that permits a portion of the bracket 12d''' to pivot relative the front frame member 12a). A base plate 44 extending from the junction box 30 may be attached to the bracket 12d''' by the plurality of base plate fasteners 42.

A threaded stem 46 may extend away from each track side roller 32a-32d of the plurality of track side rollers $32_{12c}$. The threaded stem 46 extending from each track side roller 32a-32d may each be inserted through openings 48 formed in the base plate 44 such that: 1) the threaded stem 46 of each track side roller 32a-32d may extend through each opening 48 and beyond an upper side surface 52 of the base plate 44, and 2) each track side roller 32a-32d be disposed proximate, adjacent or directly opposite a lower side surface 54 of the base plate 44.

The threaded stem 46 extending from a first track side roller 32a and a second track side roller 32b may further extend beyond the upper side surface 52 of the base plate 44 and through a first pair of passages 56a formed in the track top roller bracket 36 for coupling the track top roller bracket 36 to the base plate 44. The plurality of track roller fasteners $40_{12c}$ may then be threadingly-coupled to the threaded stems 46 in order to rotatably-couple the plurality of track side rollers $32_{12c}$ with respect to the base plate 44 and also to join the track top roller bracket 36 to the base plate 44.

Referring to FIG. 3A, the track guide assembly 14c also includes a plurality of track side rollers $32_{14c}$ including threaded stems 46, a plurality of track roller fasteners $40_{14c}$ and a base plate 44. The plurality of track roller fasteners $40_{14c}$ are joined to the threaded stems 46 in a substantially similar manner as described above for rotatably-joining the track side rollers $32_{14c}$ relative to the base plate $44_{14c}$. Further, the plurality of track side rollers $32_{14c}$ interact with the track, TR, in a similar manner as will be described with respect to the plurality of track side rollers $32_{12c}$ and the track, TR.

Referring back to FIG. 6A, the track top roller bracket 36 may further include a second pair of passages 56b. The second pair of passages 56b may be substantially orthogonal to the first pair of passages 56a. A passage 58 of the track top roller 34 may be aligned with the second pair of passages 56b. The top track roller pin 38 may be inserted through the second pair of passages 56b and the passage 58 of the track top roller 34 for rotatably-coupling the track top roller 34 to the track top roller bracket 36.

Referring to FIG. 6B, an exemplary portion of the track, TR, is shown according to an embodiment. The track, TR, includes a top surface, $TR_T$, and a side surface, $TR_S$.

The power rails, PR, are connected to/extend from the top surface, $TR_T$, of the track, TR, and are spaced apart to form a gap, $PR_G$, exposing a portion, $TR_{T-P}$, of the top surface, $TR_T$, of the track, TR. The power rails, PR, include an ascending ramp surface, $PR_A$, a descending ramp surface, $PR_D$, and an intermediate, top surface, $PR_T$, between the ascending ramp surface, $PR_A$, and the descending ramp surface, $PR_D$.

The plurality of track side rollers $32_{12c}$, $32_{14c}$ may or may not directly engage the side surface, $TR_S$, of the track, TR. In an embodiment, as seen in FIG. 8A, the track, TR, may include a width, $TR_W$, that is less than a spaced-apart distance, $S_{32}$, of opposing track side rollers of the plurality of track side rollers $32_{12c}$, $32_{14c}$. Accordingly, as seen in FIG. 8A, in some circumstances, none of the plurality of track side rollers $32_{12c}$, $32_{14c}$ may directly engage the side surface, $TR_S$, of the track, TR. Conversely, as seen in FIG. 8B, for example, some of the plurality of track side rollers $32_{12c}$, $32_{14c}$ may directly engage the side surface, $TR_S$, of the track, TR. As seen in FIG. 6B, the track top roller 34 is arranged for alignment with the is aligned within the gap, $PR_G$, between the power rails, PR, such that the track top roller 34 may directly engage the portion, $TR_{T-P}$, of the top surface, $TR_T$, of the track, TR; accordingly, as the electrical contact assembly 12c moves along/traverses the length, $PR_L$, of the power rails, PR, the track top roller 34 passes through the gap, $PR_G$, for consistently and directly engaging the portion, $TR_{T-P}$, of the top surface, $TR_T$, of the track, TR, should the track top roller 34 contact the top surface, $TR_T$, of the track, TR.

Referring to FIGS. 7A-7B, the electrical contact assembly 12c further includes a pivotable power rail contact member 60 and a biasing member 62. A proximal end 60', 62' of each of the pivotable power rail contact member 60 and the biasing member 62 may extend away from the lower side surface 54 of the base plate 44. A distal end 62" of the biasing member 62 is directly connected to a distal end 60" of the pivotable power rail contact member 60.

In an embodiment, the proximal end 60' of the pivotable power rail contact member 60 may form a pivot joint; the pivot joint 60' may be disposed within a passage 64 formed by the base plate 44 such that the pivot joint 60' may be arranged in direct contact/electrical communication with the junction box 30. In an embodiment, the proximal end 62' of the biasing member 62 may be directly connected to the lower side surface 54 of the base plate 44.

As seen in FIG. 7A, when the biasing member 62 is arranged in an expanded orientation, the biasing member 62 maintains the distal end 60" of the pivotable power rail contact member 60 at a first distance, $D_{60}$, away from the lower side surface 54 of the base plate 44. The first distance, $D_{60}$, results in the distal end 60" of the pivotable power rail contact member 60 being arranged in a spaced-apart relationship at a distance, S, with respect to the top surface, $TR_T$, of the track, TR, such that a portion of the distal end 60" of the pivotable power rail contains member 60 remains within a plane, P, that also intersects the power rails, PR, and is also parallel to the top surface, $TR_T$, of the track, TR.

Referring to FIG. 7B, as the electrical contact assembly 12c moves (see, e.g., arrow M) along and traverses the length, $PR_L$, of the power rails, PR, the distal end 60" of the pivotable power rail contact member 60 may eventually directly contact: firstly, the ascending ramp surface, $PR_A$, then, the top surface, $PR_T$ (as seen in FIG. 7B), and then, the descending ramp surface, $PR_D$, of the power rail, PR, due to the distal end 60" of the pivotable power rail contact member 60 traversing the plane, P, when the pivotable power rail contact member 60 is arranged in an expanded orientation as described above. Once the distal end 60" of the pivotable power rail contact member 60 directly contacts one of the top surface, $PR_T$, the ascending ramp surface, $PR_A$, or the descending ramp surface, $PR_D$, of the power rail, PR, the distal end 60" of the pivotable power rail contact member 60 pivots toward the lower side surface 54 of the base plate 44, thereby compressing the biasing member 62 for arrangement in a compressed orientation; when arranged in the compressed orientation, the biasing member 62 constantly applies an urging force, F, toward the distal end 60" of the pivotable power rail contact member 60 such that the distal end 60" of the pivotable power rail contact member 60 is maintained adjacent one of the top surface, $PR_T$, the ascending ramp surface, $PR_A$, or the descending ramp surface, $PR_D$, of the power rail, PR, as the electrical contact assembly 12c moves, M, along and traverses the length, $PR_L$, of the power rails, PR.

Referring to FIGS. 6A-6B and 7A-7B, the conduit 66 is shown extending away from the junction box 30. In an embodiment, as seen in FIGS. 7A-7B, the conduit 66 may be communicatively-coupled to the proximal end/pivot joint 60' of the pivotable power rail contact member 60. Referring to FIG. 5B, the conduit 66 is generally represented as an output node of the electrical contact assembly 12c. In an embodiment, the conduit 66 may communicatively-couple the electrical contact assembly 12c with a plurality of components 12f, 20a, 20b, 96, 96', 98 of the chassis 10; accordingly, in an implementation, the conduit 66 may permit the electrical contact assembly 12c to in/directly communicate power to one or more of the plurality of components 12f, 20a, 20b, 96, 96', 98 of the chassis 10.

Figure 8A:
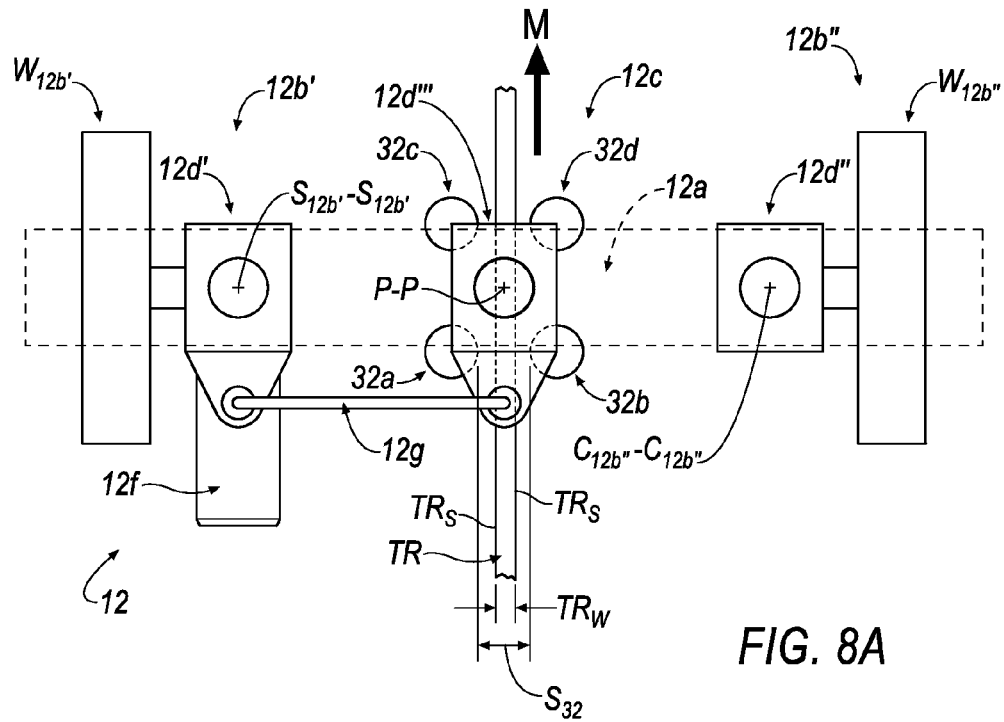
FIG. 8A is top view of the front assembly according to line 8 of FIG. 2B in accordance with an exemplary embodiment of the invention illustrating front wheels arranged in a first orientation.
Figure 8B:
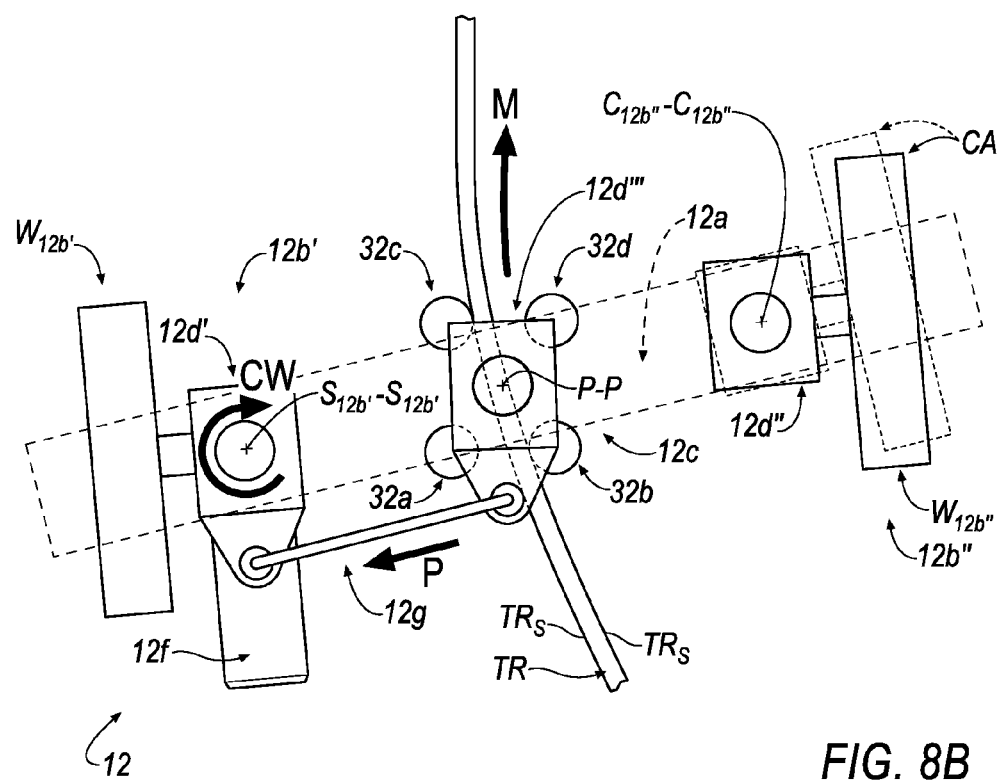
FIG. 8B is a top view of the front assembly of FIG. 8A according to an embodiment of the invention illustrating front wheels arranged in a second orientation.

Referring to FIG. 8A, when the chassis 10 moves along a substantially linear segment of the track, TR, according to the direction of the arrow, M, the active wheel, $W_{12b}$, and the caster wheels, $W_{12b'}$, $W_{14b'}$, $W_{14b''}$, may be arranged in a substantially parallel relationship with respect to the track, TR. Further, the plurality of track side rollers $32_{12c}$, $32_{14c}$ may be arranged in one of a spaced-apart or directly engaging relationship with respect to the side surface, $TR_S$, of the track, TR.

Referring to FIG. 8B, when the chassis 10 moves along, for example, a substantially arcuate segment of the track, TR, according to the direction of the arrow, M, the second and third track side rollers 32b, 32c may, in an embodiment, directly engage the side surface, $TR_S$, of the track, TR, whereas the first and fourth track side rollers 32a, 32d do not, in an embodiment, engage the side surface, $TR_S$, of the track, TR. Further, when moving, M, along the substantially arcuate segment of the track, TR, a portion of the electrical contact assembly 12c may act as a "master" in a "master-slave" relationship) that steers the first wheel assembly 12b' (i.e., the first wheel assembly 12b' acts as a "slave" in the "master-slave" relationship). Because the caster wheels, $W_{12b''}$, $W_{14b''}$, $W_{14b'''}$, are not controlled by a "master," the caster wheels, $W_{12b''}$, $W_{14b''}$, $W_{14b'''}$, are permitted to caster, CA, such that the caster wheels, $W_{12b''}$, $W_{14b''}$, $W_{14b'''}$, may self-align with a steering direction of the active wheel, $W_{12b''}$.

As seen in FIGS. 8A-8B, the bracket 12d' of the first wheel assembly 12b' is connected to the bracket 12d''' of the electrical contact assembly 12c by the drag link 12g. As seen in FIG. 8B, when the chassis 10 moves, M, along, for example, the substantially arcuate segment of the track, TR, the contact of, for example, the second and third track side rollers 32b, 32c with the track, TR, results in a shift in a spatial orientation of the electrical contact assembly 12c that results in the bracket 12d''' of the electrical contact assembly 12c exerting a pushing force upon the drag link 12g according to the direction of the arrow, P. The pushing force, P, is thereby transmitted from the drag link 12g to the bracket 12d' of the first wheel assembly 12b' such that the bracket 12d' rotates the first wheel assembly 12b' relative to the front frame member 12a in a clockwise direction, CW, about the steering axis, $S_{12b'}$-$S_{12b''}$, as a result of the rotation, CW, of the first wheel assembly 12b', the active wheel, $W_{12'}$, which is connected to the first wheel assembly 12b' is thereby said to be steered by the drag link 12g. Although not illustrated, the drag link 12g may impart a pulling full (i.e., a force that is opposite the direction of the pushing force, P) that results in a counter-clockwise rotation of the first wheel assembly 12b'.

Figure 9A:
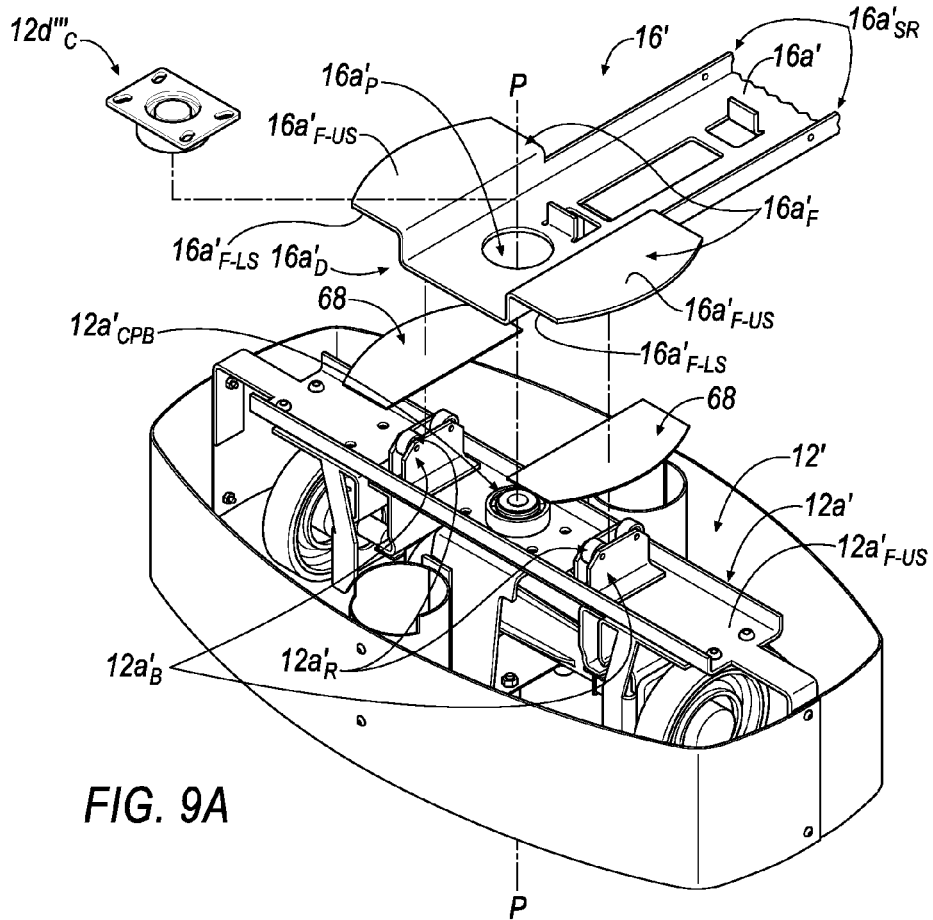
FIG. 9A is a partial exploded, perspective view of an alternative front assembly of a chassis in accordance with an exemplary embodiment of the invention.
Figure 9B:
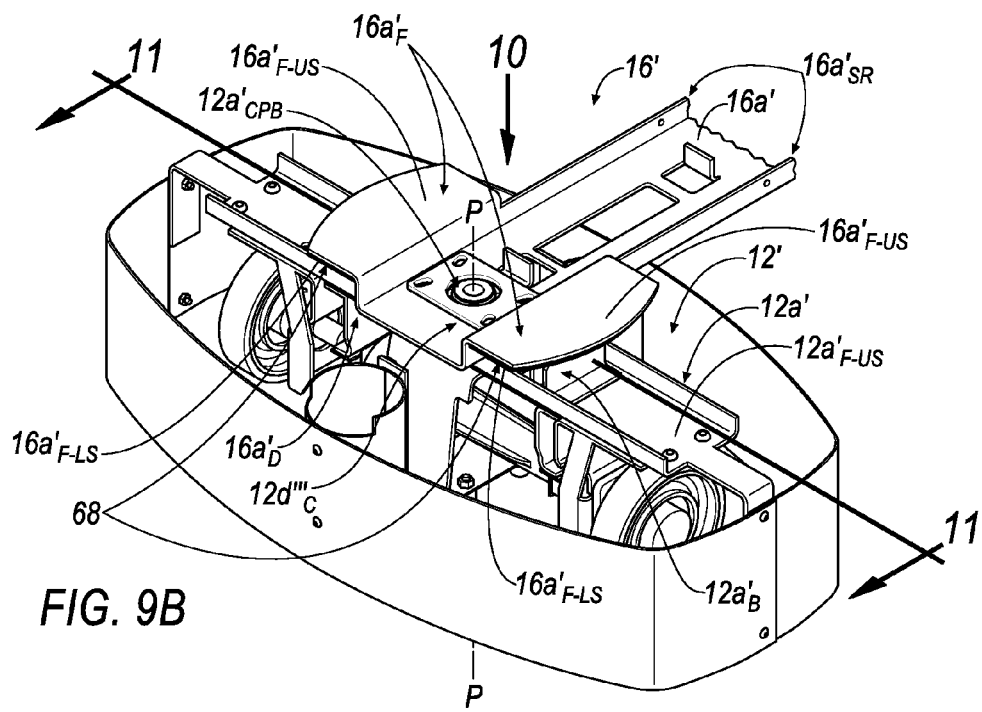
FIG. 9B is an assembled, perspective view of the chassis of FIG. 9B.

Referring to FIGS. 9A-9B, a portion of an alternative base frame member 16a' of an alternative intermediate assembly 16' is shown according to an embodiment. The base frame member 16a' includes a pair of laterally-projecting flanges $16a'_F$. The pair of laterally-projecting flanges $16a'_F$ extend away from side rail flanges $16a'_{SR}$ of the base frame member 16a' and may be located at a distal end $16a'_D$ of the base frame member 16a'.

A pad 68 may be attached to a lower surface $16a'_{F-LS}$ of each flange of the pair of laterally-projecting flanges $16a'_F$. The pad 68 may include a material comprising a high friction coefficient/having a high degree of lubricity such that upon attachment of the pad 68 to the lower surface $16a'_{F-LS}$ of each flange of the pair of laterally-projecting flanges $16a'_F$, the lower surface $16a'_{F-LS}$ of each flange of the pair of laterally-projecting flanges $16a'_F$, may be permitted to easily slide or slip relative to an alternative front frame member 12a'.

Also referring to FIGS. 9A-9B, the alternative front frame member 12a' of an alternative front assembly 12' is shown according to an embodiment. The front frame member 12a' may further comprise a pair of brackets $12a'_B$ that are attached to and extend away from an upper surface $12a'_{F-US}$ of the front frame member 12a'. A pair of load-bearing roller members $12a'_R$ may be rotatably-coupled to and extend beyond an upper surface of the pair of brackets $12a'_B$.

In an embodiment, upon attachment of the base frame member 16a' to the front frame member 12a', the pair of load-bearing roller members $12a'_R$ may directly engage the pad 68 (as seen in, e.g., FIGS. 11 and 12) that is attached to the lower surface $16a'_{F-LS}$ of each flange of the pair of laterally-projecting flanges $16a'_F$. However, in an alternative embodiment, the pair of load-bearing roller members $12a'_R$ may not directly engage/be arranged in a spaced-apart relationship with respect to the pad 68 that is attached to the lower surface $16a'_{F-LS}$ of each flange of the pair of laterally-projecting flanges $16a'_F$.

As shown above at FIGS. 8A-8B, when the chassis 10 moves along a substantially arcuate segment of the track, TR, according to the direction of the arrow, M, the front frame member 12 may pivot about a pivot axis, P-P, from a first orientation that is aligned with the brackets 12d', 12d'', 12d''' (as seen in FIG. 8A) to a second orientation that is not aligned with the brackets 12d', 12d'', 12d''' (as seen in FIG. 8B). Accordingly, when a load (e.g., the cart 1 and one or more tire-wheel assemblies, TW) are placed upon the sub-assembly 18, a weight arising from the load may, in an embodiment, bear upon the pivoting connection of the base frame member 16a and the front frame member 12a; thus, the weight may inhibit a pivoting motion of front frame member 12 relative to the frame member 16 about the pivot axis, P-P. The design of the alternative front frame member 12a' and the base frame member 16a' as described at FIGS. 9A-9B may overcome such issues.

Figure 10A:
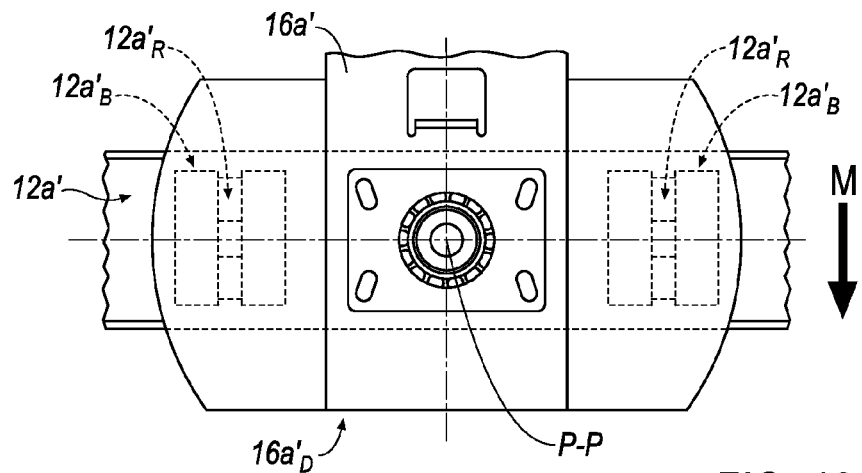
FIGS. 10A-10C are top views according to line 10 of FIG. 9B in accordance with an exemplary embodiment of the invention.
Figure 10B:
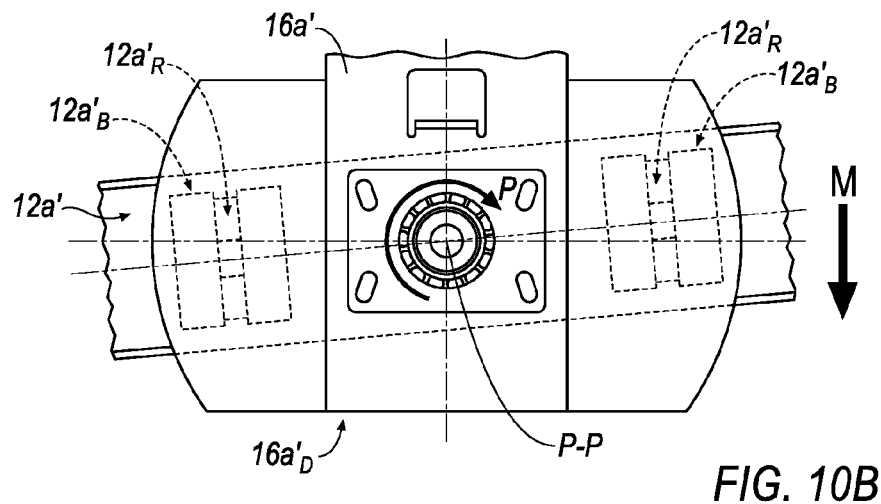
Figure 10C:
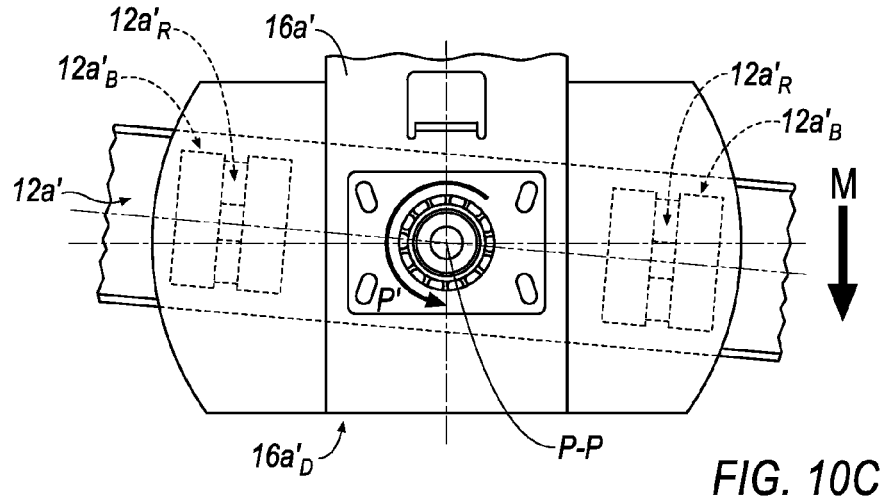

As seen in FIG. 9B, the pair of laterally-projecting flanges $16a'_F$ extend away from the pivot axis, P-P; accordingly, any weight arising from, for example, the cart 1 and the tire-wheel assembly, TW, may be incident upon an upper surface $16a'_{F-US}$ of each flange of the pair of laterally-projecting flanges $16a'_F$, and away from the pivot axis, P-P, thereby alleviating an application of the weight directly upon the pivot axis, P-P. Further, once the weight is transferred to each flange of the pair of laterally-projecting flanges $16a'_F$, the weight may then be transferred to the front frame member 12a' by way of the pair of load-bearing roller members $12a'_R$ and the pair of brackets $12a'_B$. Because the pair of load-bearing roller members $12a'_R$ may, in an embodiment, directly engage the high lubricity pad 68, the pair of load-bearing roller members $12a'_R$ further increases the ability for the front frame member 12a' to pivot (according to: 1) the direction of the arrow, P, in FIG. 10B, or, 2) the direction of the arrow, P', in FIG. 10C) relative to the base frame member 16a' about the pivot axis, P-P.

Referring to FIG. 9A, the front frame member 12a' may further comprise a center pivot bearing $12a'_{CPB}$ that is attached to and extend away from an upper surface $12a'_{F-US}$ of the front frame member 12a'. The pivot axis, P-P, centrally extends through the center pivot bearing $12a'_{CPB}$.

Figure 11:
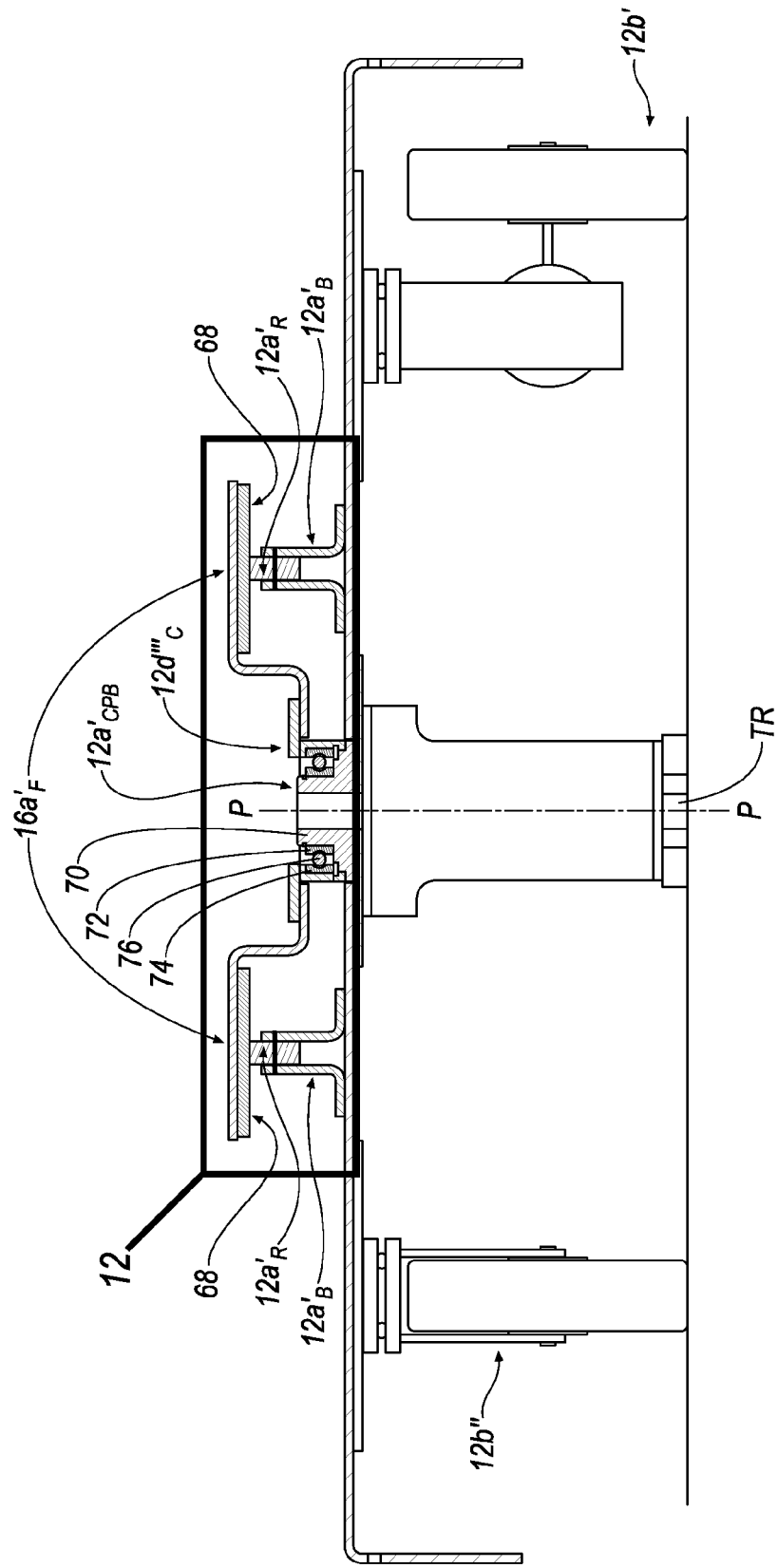
FIG. 11 is a cross-sectional view according to line 11-11 of FIG. 9B in accordance with an exemplary embodiment of the invention.

Referring to FIG. 11, the center pivot bearing $12a'_{CPB}$ includes a body 70, an inner race 72 secured to the body 70, an outer race 74 secured to the inner race 72 and a bearing 76 disposed between the inner race 72 and the outer race 74. Referring back to FIG. 9A, the base frame member 16a' forms a passage $16a'_P$ that receives the center pivot bearing $12a'_{CPB}$ such that the base frame member 16a' to is permitted to be disposed upon and be supported by the center pivot bearing $12a'_{CPB}$ of the front frame member 12a'. A bracket cap $12d''_C$ of the bracket 12d''' may be disposed with the passage $16a'_P$ over the center pivot bearing $12a'_{CPB}$ for closing-out the passage $16a'_P$.

Referring to FIG. 12, the base frame member 16a' is shown in a neutral orientation that is substantially parallel to the front frame member 12a'. As a result of the cooperation of the center pivot bearing $12a'_{CPB}$ and the passage $16a'_P$ of the base frame member 16a', if for example, a force/load, L (see, e.g., FIG. 12' or 12"), is applied to the base frame member 16a', the center pivot bearing $12a'_{CPB}$ may permit the base frame member 16a' to tilt (see, e.g., angle, +θ, in FIG. 12' or angle, −θ, in FIG. 12") relative to the front frame member 12a' such that the base frame member 16a' is not in the neutral, substantially parallel orientation relative to the front frame member 12a'.

Figure 13:
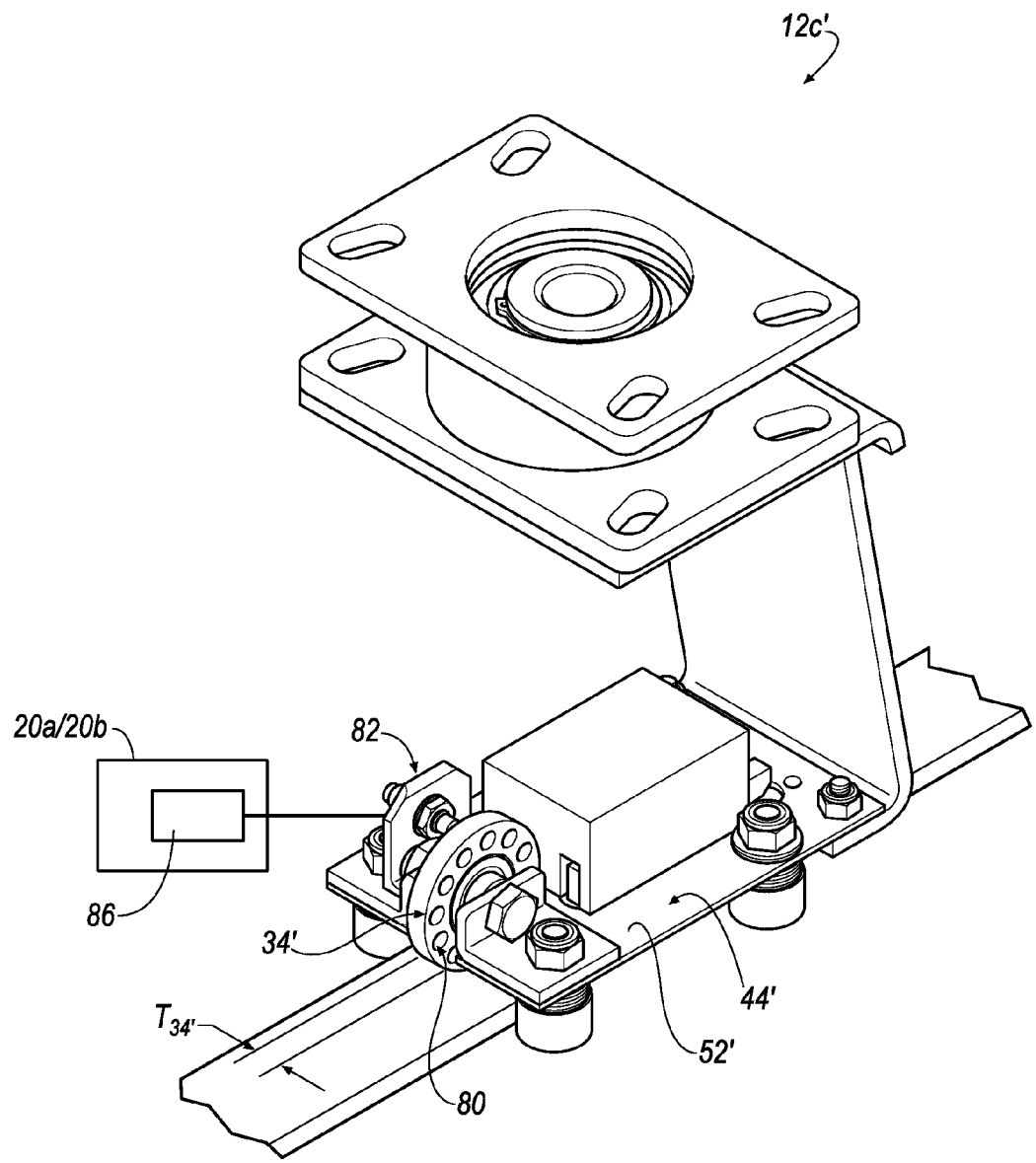
FIG. 13 illustrates a perspective view of an electrical contact assembly in accordance with an exemplary embodiment of the invention.
Figure 14A:
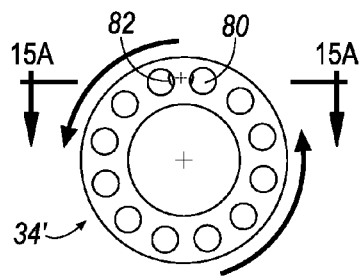
FIGS. 14A-14D illustrate side views of a track top roller of the electrical contact assembly of FIG. 13 in accordance with an exemplary embodiment of the invention.

Referring to FIG. 13, an alternative electrical contact assembly 12c' having an alternative track top roller 34' is shown according to an embodiment. The track top roller 34' includes a plurality of equally-spaced-apart circumferential passages 80 that extend through a thickness, $T_{34'}$, of the track top roller 34'. The electrical contact assembly 12c' may include a sensor 82 that extends away from the upper side surface 52' of the base plate 44'. The sensor 82 is arranged proximate but in a spaced-apart relationship with respect to the track top roller 34'.

Referring to FIGS. 14A-14D and 15A-15D, a plurality of orientations of the track top roller 34' relative to the sensor 82 are shown according to an embodiment. Referring to FIGS. 16A-16D, a plurality of electronic speed signal snapshots 84 including speed signal snapshots 84a, 84b, 84c, 84d that correspond to the orientations of the track top roller 34' of FIGS. 14A-14D and 15A-15D are shown according to an embodiment. The plurality of electronic speed signal snapshots 84 may be generated by conditioning electronics 86 that is/are communicatively-coupled to the sensor 82; the conditioning electronics 86 may be located within, for example, one or more of the first enclosure 20a and the second enclosure 20b, as seen in, for example, FIG. 13.

Figure 15A:
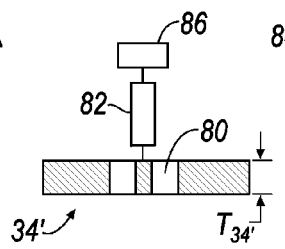
FIGS. 15A-15D illustrate cross-sectional views of the track top roller of FIGS. 14A-14D according to lines 14A-14A, 14B-14B, 14C-14C and 14D-14D in accordance with an exemplary embodiment of the invention.
Figure 16A:
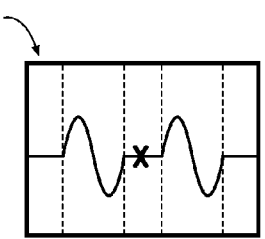
FIGS. 16A-16D illustrate an electronic speed signal that corresponds to an orientation of the track top roller of FIGS. 15A-15D in accordance with an exemplary embodiment of the invention.
Figure 14B:
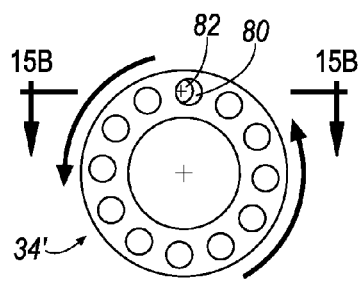
Figure 15B:
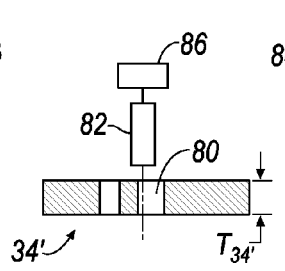
Figure 16B:
Figure 14C:
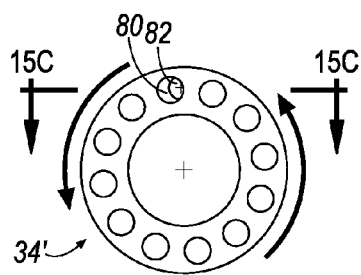
Figure 15C:
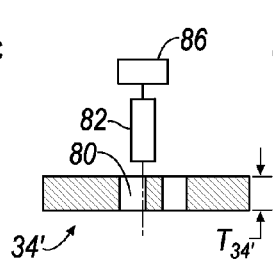
Figure 16C:
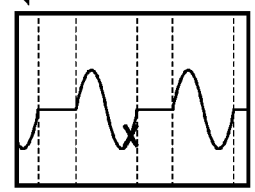
Figure 14D:
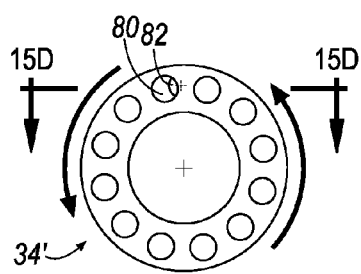
Figure 15D:
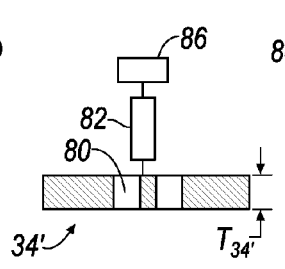
Figure 16D:
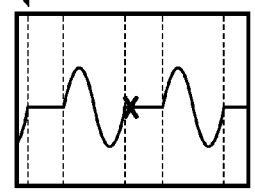

Referring firstly to FIGS. 15A and 15D, the sensor 82 is shown aligned with a portion of the thickness, $T_{34'}$, of the track top roller 34' that does not include a passage of the plurality of passages 80. Referring to FIGS. 16A and 16D, when the sensor 82 is aligned with the portion of the thickness, $T_{34'}$, of the track top roller 34', the conditioning electronics 86 generates a portion of a speed signal; a snapshot of the speed signal corresponding to the orientation of the track top roller 34' of FIGS. 15A and 15D is shown generally at 84a, 84d (with the portion of the speed signal represented by an "X"). As seen in the speed signal snapshots 84a, 84d, when the sensor 82 is aligned with a portion of the thickness, $T_{34'}$, of the track top roller 34', the portion of the speed signal, X, generated by the conditioning electronics 86 is, for example, a "zero" signal.

Referring to FIGS. 15B and 15C, the sensor 82 is shown aligned with a passage of the plurality of passages 80 of the track top roller 34'. Referring to FIGS. 16B and 16C, when the sensor 82 is aligned with a passage of the plurality of passages 80 of the track top roller 34', the conditioning electronics 86 generates a portion of the speed signal; a snapshot of the speed signal corresponding to the orientation of the track top roller 34' of FIGS. 15B and 15C is shown generally at 84b, 84c. As seen in the speed signal snapshots 84b, 84c, when the sensor 82 is aligned with a passage of the plurality of passages 80 of the track top roller 34', the portion of the speed signal, X, generated by the conditioning electronics 86 is, for example, a portion of a non-zero, sinusoidal signal.

The portion of the speed signal, X, represented by a zero signal and a portion of a sinusoidal signal may arise from a material type of the track top roller 34' and the type of sensor comprising the sensor 82. In an embodiment, the track top roller 34' may include a magnetic material and the sensor 82 may be a magnetic sensor. Accordingly, as the magnetic sensor 82 begins to sense a passage 80 of the plurality of passages (as seen in, e.g., FIG. 15B), the speed signal snapshots 84b may correspond to a first portion of a sinusoidal curve that extends away from the "zero" signal; conversely, as the magnetic sensor 82 begins to sense an approach a portion of the thickness, $T_{34'}$, of the track top roller 34' (as seen in, e.g., FIG. 15C), the speed signal snapshots 84c may correspond to a second, rising portion of a sinusoidal curve that extends toward the "zero" signal.

Functionally, the frequency of the speed signal is proportional to the speed of the chassis 10 and/or cart 1 relative the track due to, for example, the track top roller 34' directly contacting the top surface, $TR_T$, of the track, TR, such that the track top roller 34' rotates at substantially the same rate of speed as that of the active and passive wheels $W_{12b'}$, $W_{12b''}$, $W_{14b'}$, $W_{14b''}$ that contact and roll relative to an underlying ground surface, G. Accordingly, in an embodiment, the conditioning electronics 86 may communicate the speed signal to a controller in one or more of the first enclosure 20a and the second enclosure 20b. The controller, therefore, may interpret the speed signal and display an alpha-numeric reading upon, for example, one of the plurality of status indicators 22, and/or, upon, for example, a monitor that may be located, for example, within, for example, a management office proximate the course, C, in order to communicate the speed of one or more of the carts 1 traversing the course, C, to for example, a manager.

Figure 17A:
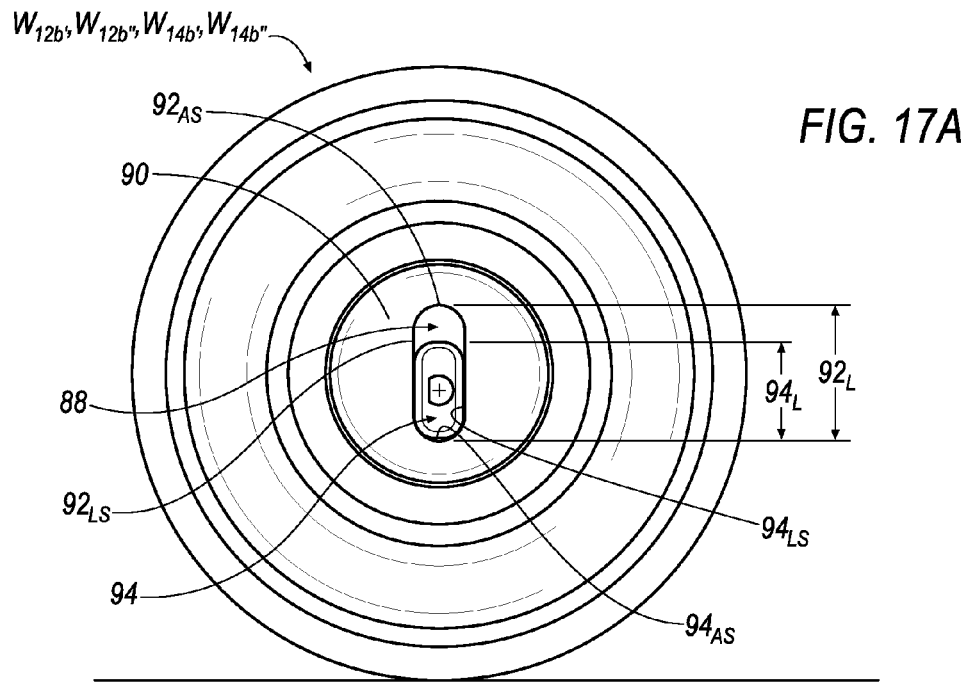
FIGS. 17A-17B illustrate side views of a wheel of the chassis in accordance with an exemplary embodiment of the invention.
Figure 17B:
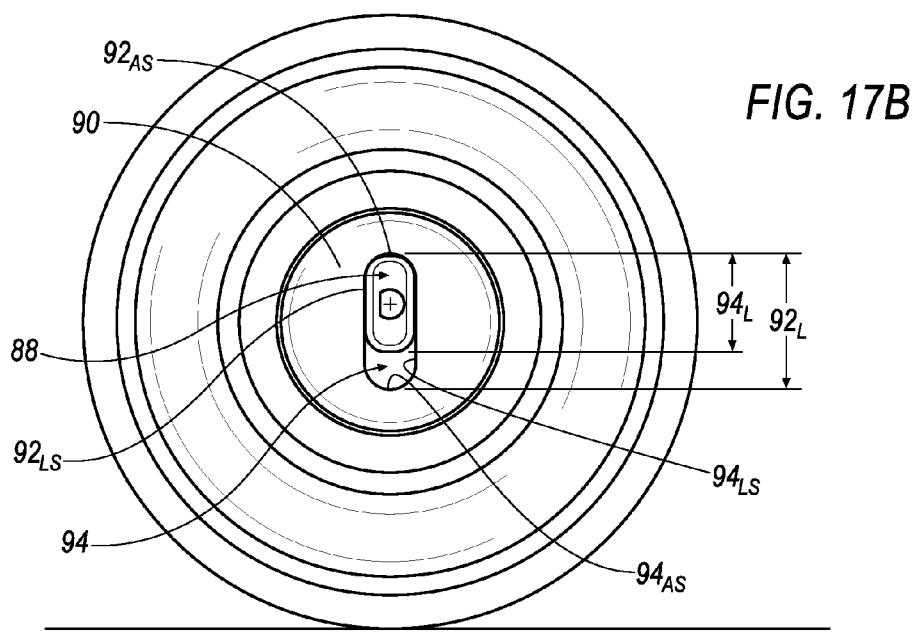

Referring to FIGS. 17A-17B, a side view of any one of the active or caster wheels $W_{12b'}$, $W_{12b''}$, $W_{14b'}$, $W_{14b''}$ is shown according to an embodiment. The wheel $W_{12b'}$, $W_{12b''}$, $W_{14b'}$, $W_{14b''}$ may include a central passage 88 that receives a hub 90. The hub 90 may include an elongated, non circular (e.g., substantially oval-shaped) passage 92 formed by, for example, opposing linear segments $92_{LS}$ and opposing arcuate segments $92_{AS}$.

An axle 94 is disposed within the passage 92 formed by the hub 90. The axle 94 includes an outer surface geometry formed by opposing linear segments $94_{LS}$ and opposing arcuate segments $94_{AS}$. The linear segments $92_{LS}$ of the passage 92 include a length $92_L$ that is greater than a length $94_L$ of the linear segments $94_{LS}$ of the axle 94; accordingly, the axle 94 is permitted to "float" (i.e., move upwardly or downwardly) within the passage 92 relative to the hub 90 to/from a down orientation (see, e.g., FIG. 17A) and an up orientation (see, e.g., FIG. 17B); alternatively, it may be said that the hub 90 is permitted to float relative to the axle 94. Because the axle 94 is permitted to float within the passage 92, the wheel $W_{12b'}$, $W_{12b''}$, $W_{14b'}$, $W_{14b''}$ may shift upwardly/downwardly in view of surface irregularities encountered by the wheel $W_{12b'}$, $W_{12b''}$, $W_{14b'}$, $W_{14b''}$ as the cart 1 traverses the course, C.

Figure 18A:
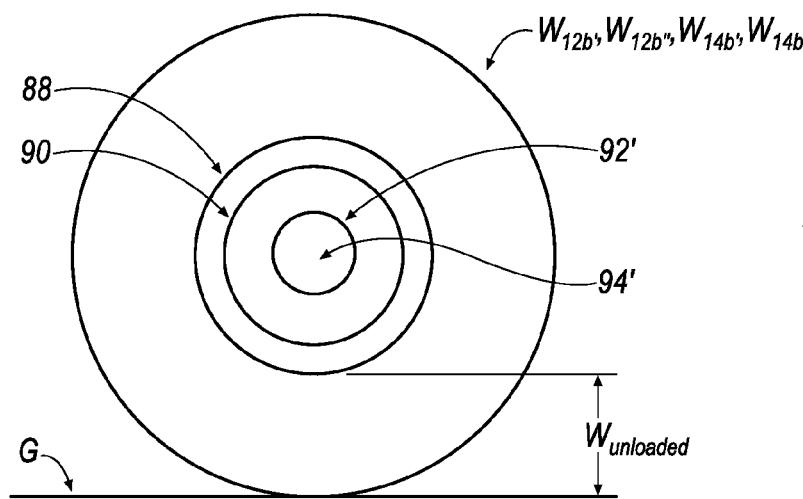
FIGS. 18A-18C illustrate side views of a wheel of the chassis in accordance with an exemplary embodiment of the invention.
Figure 18B:
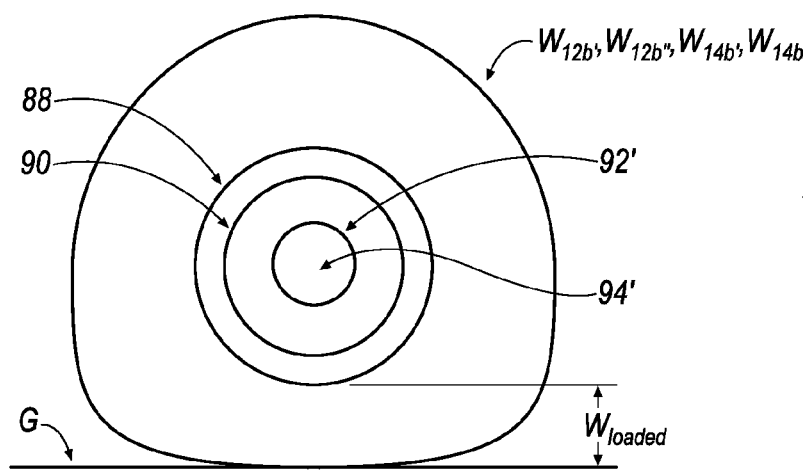
Figure 18C:
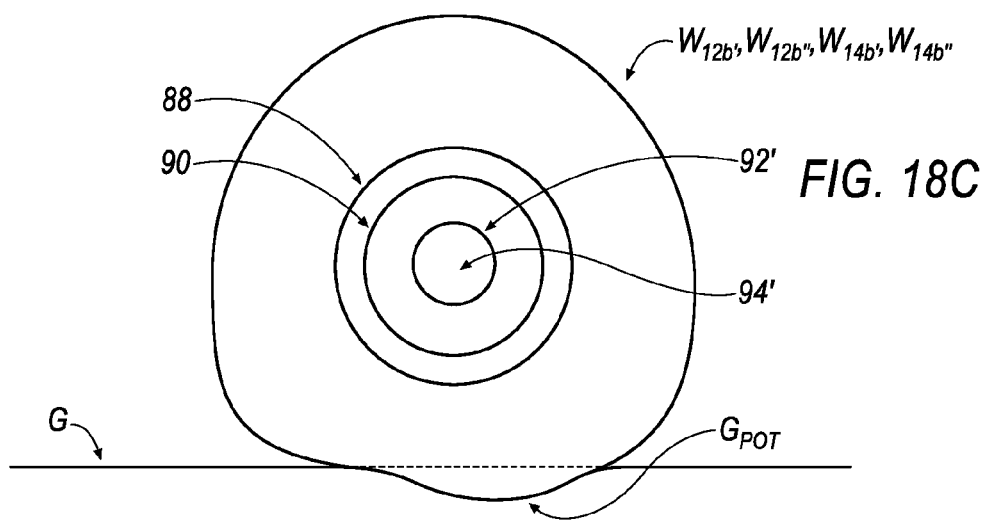

Referring to FIGS. 18A-18C, a side view of any one of the active or caster wheels $W_{12b'}$, $W_{12b''}$, $W_{14b'}$, $W_{14b''}$ is shown according to an embodiment. Like the embodiment of FIGS. 17A-17B, the wheel $W_{12b'}$, $W_{12b''}$, $W_{14b'}$, $W_{14b''}$ may include a central passage 88 that receives a hub 90; however, the hub 90 does not include an elongated, non circular (e.g., substantially oval-shaped) passage, but, rather a substantially circular passage 92' that correspondingly-receives a substantially circular axle 94' (i.e., the axle 94' is not permitted to "float" within the passage 92').

Because the axle 94' is not permitted to float within the passage 92', the wheel $W_{12b'}$, $W_{12b''}$, $W_{14b'}$, $W_{14b''}$ may include other design considerations that will compensate for surface irregularities (see, e.g., $G_{POT}$, in FIG. 18C) encountered by the wheel $W_{12b'}$, $W_{12b''}$, $W_{14b'}$, $W_{14b''}$ as the cart 1 traverses the course, C. For example, the wheel $W_{12b'}$, $W_{12b''}$, $W_{14b'}$, $W_{14b''}$ of FIGS. 18A-18C may be formed from a substantially compliant material whereas the wheel $W_{12b'}$, $W_{12b''}$, $W_{14b'}$, $W_{14b''}$ of FIGS. 17A-17B may, for example, be formed from a substantially rigid, non-compliant material.

The "compliability" of the wheel $W_{12b'}$, $W_{12b''}$, $W_{14b'}$, $W_{14b''}$ of FIGS. 18A-18C is illustrated where, for example: 1) the wheel $W_{12b'}$, $W_{12b''}$, $W_{14b'}$, $W_{14b''}$ is shown in an unloaded orientation in FIG. 18A, 2) the wheel $W_{12b'}$, $W_{12b''}$, $W_{14b'}$, $W_{14b''}$ is shown in a loaded orientation, and 3) the wheel $W_{12b'}$, $W_{12b''}$, $W_{14b'}$, $W_{14b''}$ is shown in a loaded orientation while also encountering a pot-hole, $G_{POT}$ (e.g., a surface irregularity), in an underlying ground surface, G. In FIG. 18A, where no load (i.e., the load, being, e.g., the cart 1 and/or one or more tire-wheel assemblies, TW) is applied to the wheel $W_{12b'}$, $W_{12b'''}$, $W_{14b'}$, $W_{14b'''}$, the wheel $W_{12b'}$, $W_{12b'''}$, $W_{14b'}$, $W_{14b''}$ retains a substantially circular orientation. In FIGS. 18B-18C, however, when a load is applied to the wheel $W_{12b'}$, $W_{12b'''}$, $W_{14b'}$, $W_{14b'''}$, and where the wheel $W_{12b'}$, $W_{12b'''}$, $W_{14b'}$, $W_{14b''}$ contacts an underlying ground surface, G, the wheel $W_{12b'}$, $W_{12b'''}$, $W_{14b'}$, $W_{14b''}$ no longer includes a substantially circular orientation; further, as seen in FIG. 18C, when the wheel $W_{12b'}$, $W_{12b'''}$, $W_{14b'}$, $W_{14b''}$ encounters a surface irregularity, $G_{POT}$, the compliability of the wheel $W_{12b'}$, $W_{12b'''}$, $W_{14b'}$, $W_{14b''}$ permits the wheel $W_{12b'}$, $W_{12b'''}$, $W_{14b'}$, $W_{14b''}$ to further deform in a manner such that the wheel $W_{12b'}$, $W_{12b'''}$, $W_{14b'}$, $W_{14b''}$ "fills" the surface irregularity, $G_{POT}$, as the wheel $W_{12b'}$, $W_{12b'''}$, $W_{14b'}$, $W_{14b''}$ traverses the course, C, without otherwise rigidly falling into and bouncing out of the surface irregularity, $G_{POT}$, as may happen if, for example, the wheel $W_{12b'}$, $W_{12b'''}$, $W_{14b'}$, $W_{14b''}$ included a substantially rigid material.

Figure 19A:
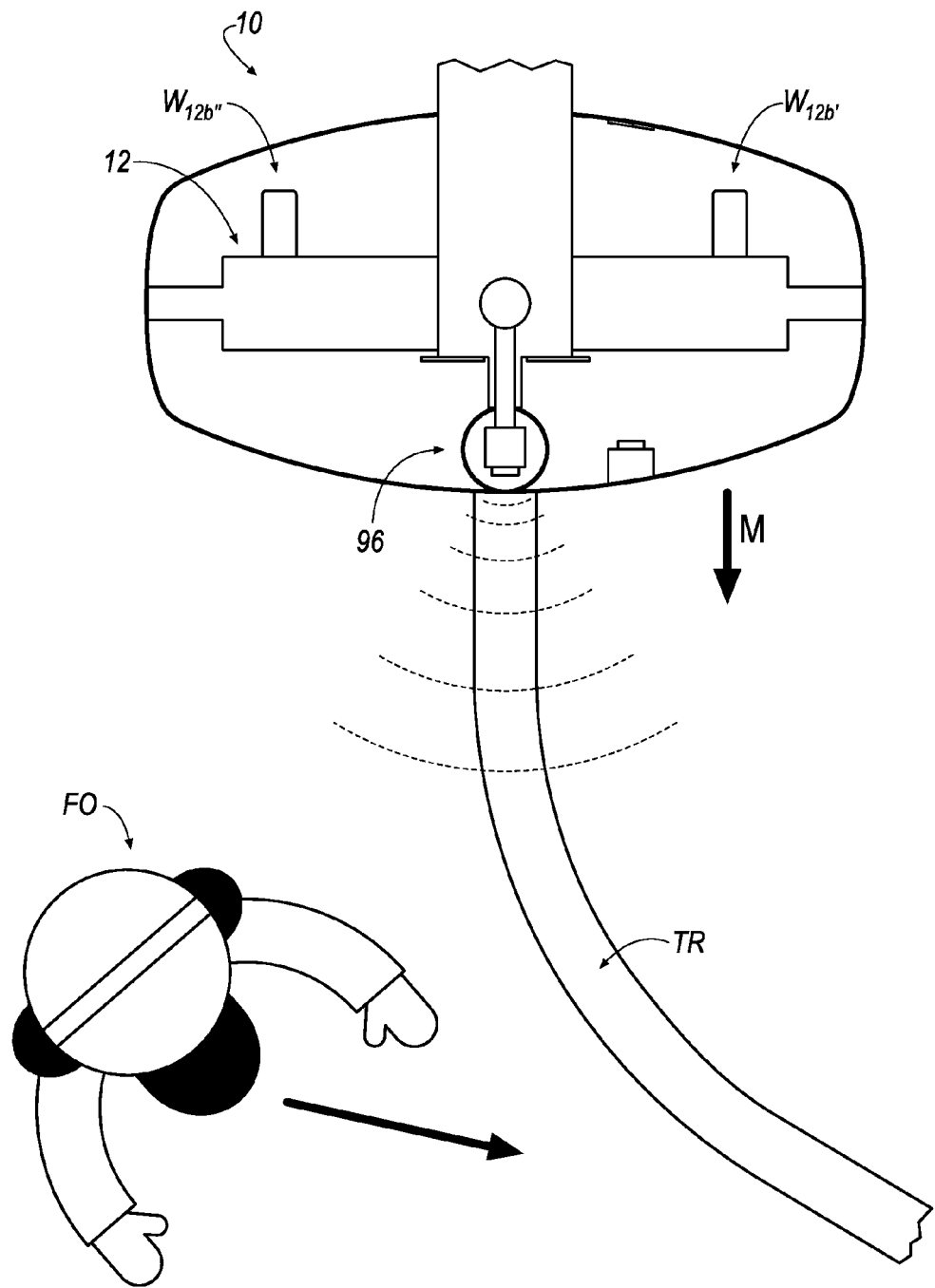
FIGS. 19A-19B illustrate partial top views of the chassis of FIG. 1 including a foreign object detection sensor in accordance with an exemplary embodiment of the invention.
Figure 19B:
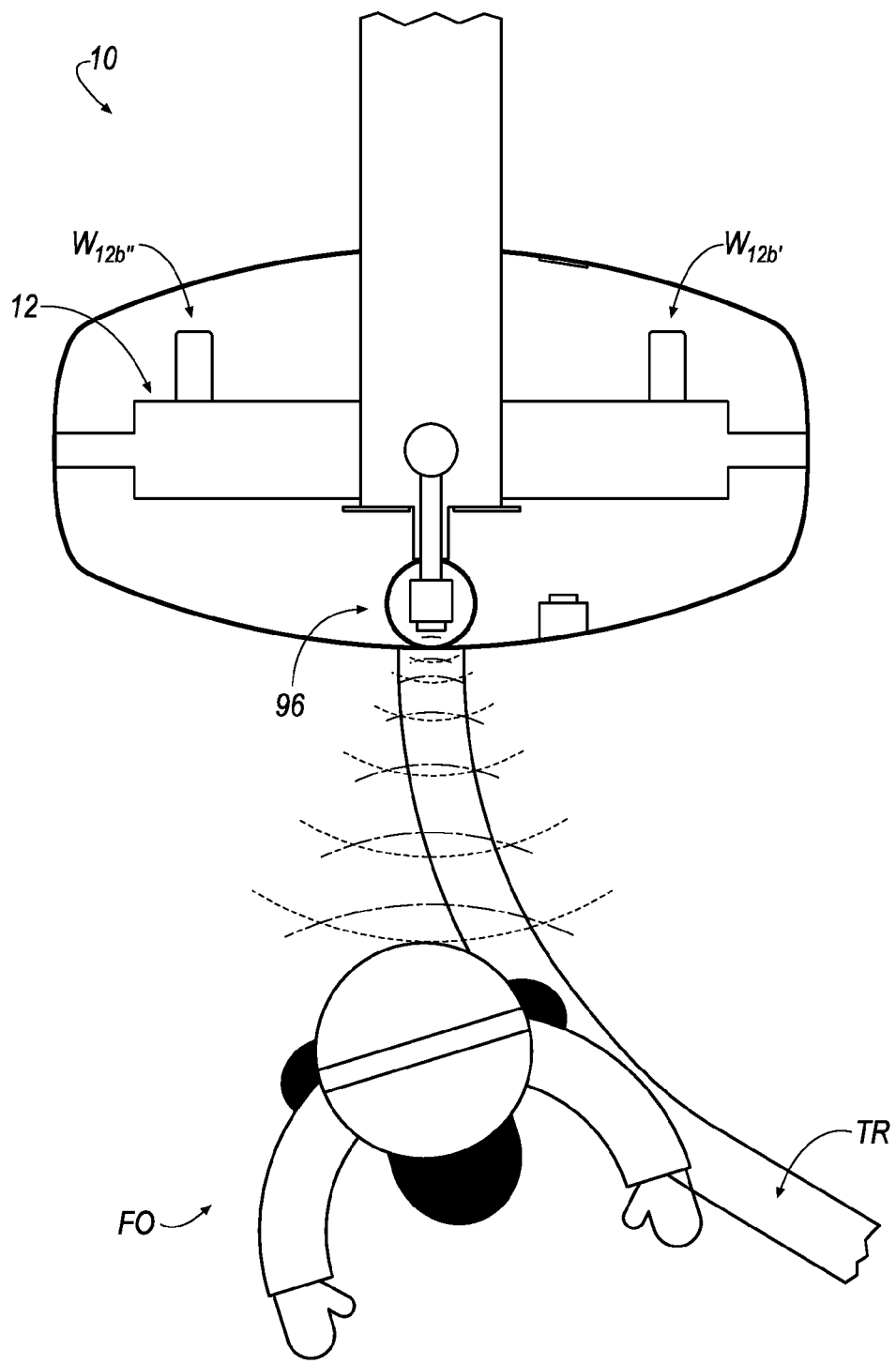

Referring to FIGS. 19A-19B, the chassis 10 may further include a foreign object detection sensor 96. The foreign object detection sensor 96 may include, for example, a light sensor, an ultrasonic sensor, or the like. The foreign object detection sensor 96 may be joined to any component of the chassis 10 such as, for example, the front frame member 12a, the rear frame member 14a and the base frame member 16a.

Functionally the foreign object detection sensor 96 may sense a presence of a foreign object, FO, that is near one or more of the chassis 10 and the track, TR. The foreign object, FO, may include, for example, an object or a person/assembly line worker that is standing or walking near one or more of the chassis 10 and the track, TR.

If, upon detection of the foreign object, FO, by the foreign object detection sensor 96, the foreign object detection sensor 96 may communicate with one or more of the first enclosure 20a and the second enclosure 20b, which may contain, for example, a controller. Referring to FIG. 5B, the foreign object detection sensor 96 is communicatively-coupled to the controller that may be disposed within one or more of the first enclosure 20a and the second enclosure 20b; once a signal indicative of foreign object detection has been communicated to the controller, the controller may send an instruction signal to, for example, the motor 12f in order to cause the motor 12f to cease rotation of the wheel $W_{12b'}$; alternatively, for example, once a signal indicative of foreign object detection has been communicated to the controller, the controller may send an instruction signal to, for example, a brake connected to, for example, the wheels $W_{12b'}$, $W_{12b''}$ of the front assembly 12 for ceasing movement, M (see, e.g., FIG. 19A), of the chassis 10. Referring to FIG. 19B, when movement of the chassis 10 according to the direction of the arrow, M, is ceased, a collision of the chassis 10 with the foreign object, FO, may be prevented.

Figure 20A:
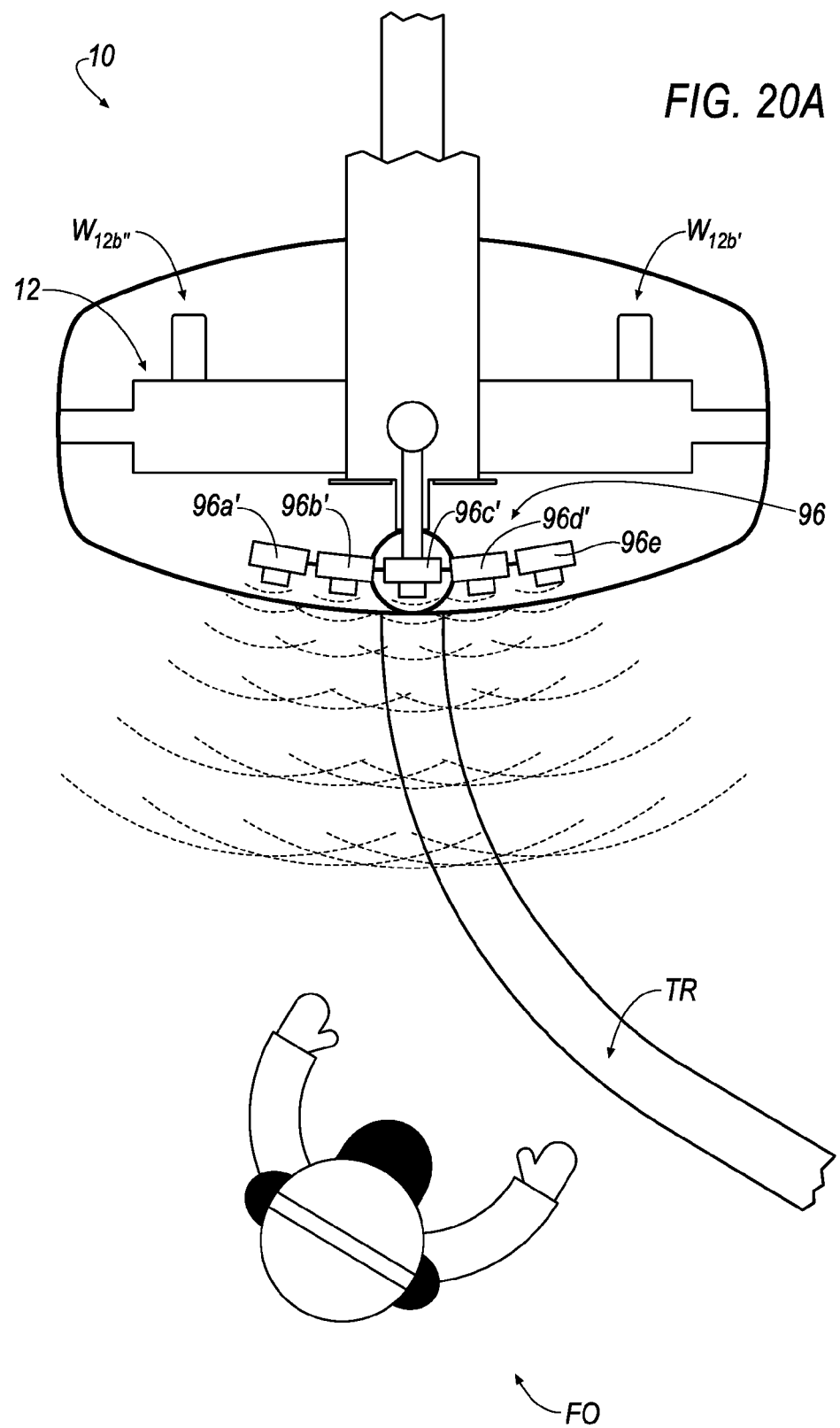
FIGS. 20A-20B illustrate partial top views of the chassis of FIG. 1 including a foreign object detection sensor array in accordance with an exemplary embodiment of the invention.
Figure 20B:
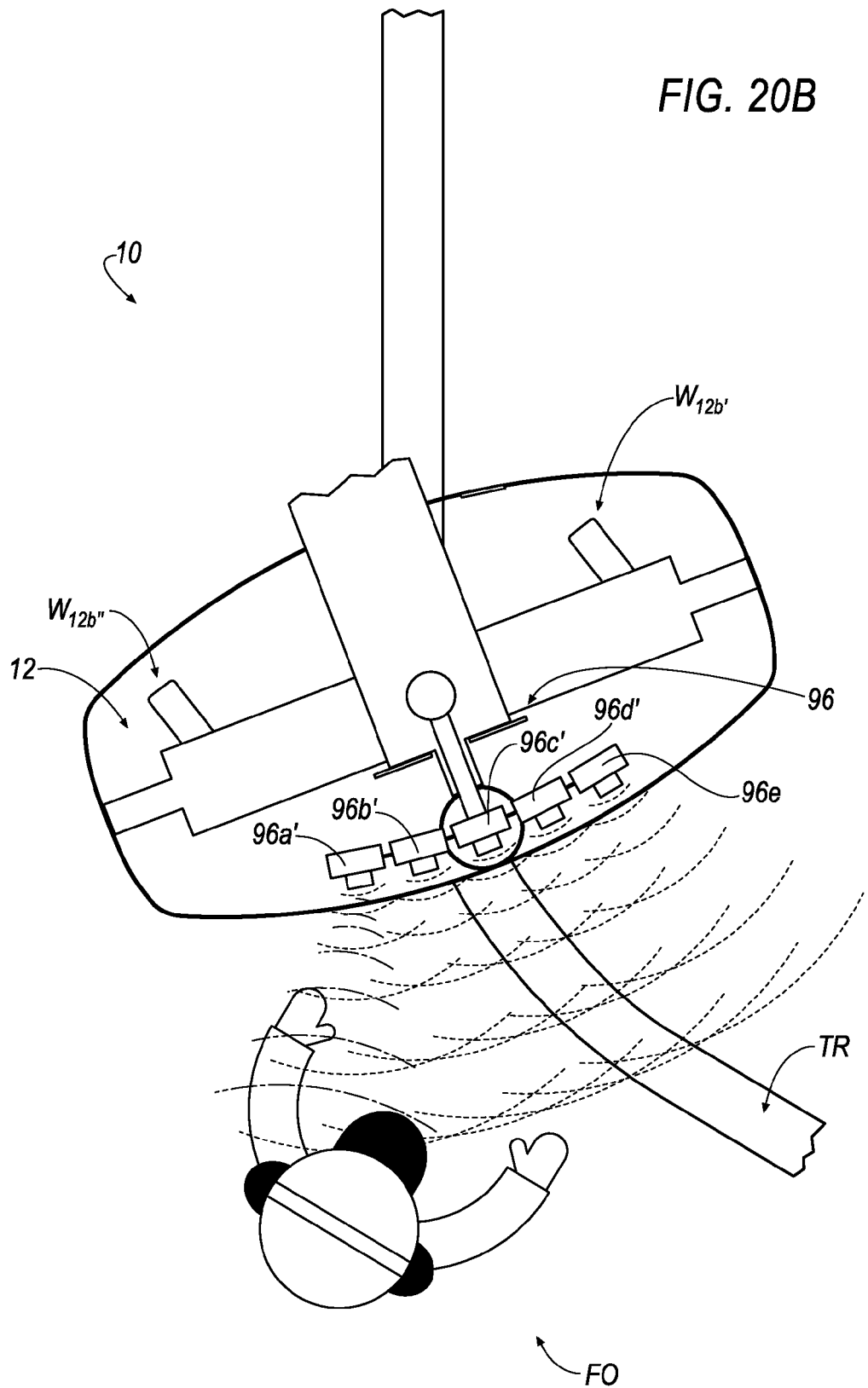

Referring to FIGS. 20A-20B, the chassis 10 may further include a foreign object detection sensor 96'. The foreign object detection sensor 96' may include, for example, a light sensor, an ultrasonic sensor, or the like. The foreign object detection sensor 96' may be joined to any component of the chassis 10 such as, for example, the front frame member 12a, the rear frame member 14a and the base frame member 16a.

Functionally the foreign object detection sensor 96' is substantially similar to the foreign object detection sensor 96 of FIGS. 19A-19B in that the foreign object detection sensor 96' may sense a presence of a foreign object, FO, that is near one or more of the chassis 10 and the track, TR. The foreign object detection sensor 96' is similarly communicatively-coupled to a controller for ceasing movement, M, of the chassis 10 in the event a foreign object, FO, is detected by the foreign object detection sensor 96'.

The foreign object detection sensor 96' is different with respect to the foreign object detection sensor 96 in that the foreign object detection sensor 96' includes an array of sensors 96a'-96e' attached to one or more of the front frame member 12a, the rear frame member 14a and the base frame member 16a. The array of sensors 96a'-96e' may permit the foreign object detection sensor 96' to increase a range of detection such that if, for example, a foreign object, FO, is locate in a "blind spot"/"blind region" of the chassis 10, the foreign object detection sensor 96' may inhibit an impact situation from arising if, for example, the foreign object, FO, is located out of a line-of-sight of one/a central sensor (see, e.g., 96c'), or, if, for example, the foreign object, FO, moves faster than the movement, M, of the chassis 10 such that the chassis 10 is not permit to react in a timely fashion that would otherwise inhibit contact of the foreign object, FO with the chassis 10. Accordingly, if the foreign object, FO, is a person that is running through a blind spot and then across the track, TR, at a rate faster than that of the movement, M, of the chassis 10, the foreign object detection sensor 96' may detect the presence of the foreign object, FO, within, for example a "blind spot"/"blind region" of the chassis 10 and cease movement of the chassis 10 much earlier than that of the foreign object detection sensor 96 in order to avoid an impact situation of the foreign object, FO, with the chassis 10.

Figure 21A:
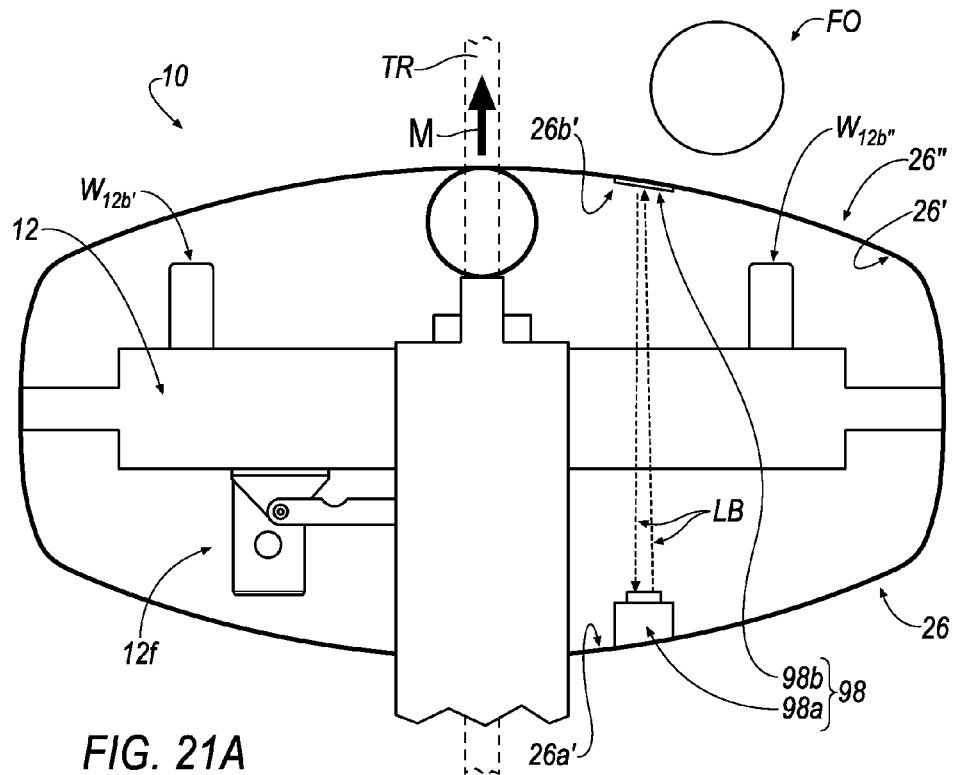
FIGS. 21A-21B illustrate partial top views of the chassis of FIG. 1 including a foreign object crash detection sensor in accordance with an exemplary embodiment of the invention.
Figure 21B:
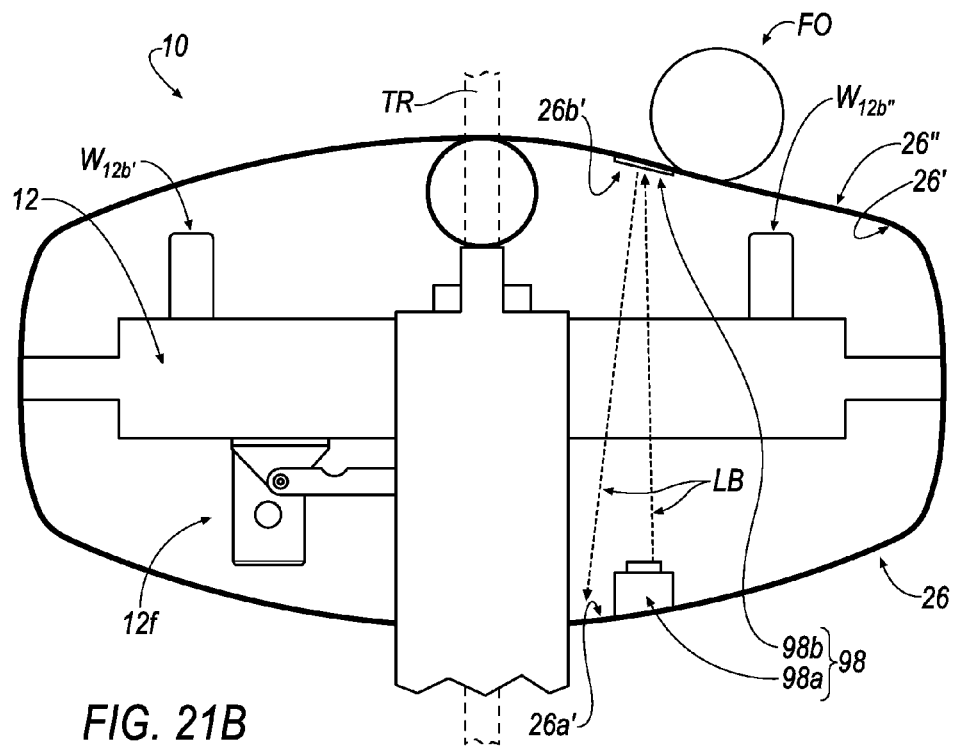

Referring to FIGS. 21A-21B, a foreign object crash detection sensor 98 is shown according to an embodiment. The foreign object crash detection sensor 98 may include, for example, a light transmitter-receiver module 98a and a reflector 98b. The foreign object crash detection sensor 98 may be joined to any component of the chassis 10 such as, for example, the front assembly shield 26.

In an implementation, the light transmitter-receiver module 98a and the reflector 98b may be attached to an interior surface 26' of the front assembly shield 26; further, in an implementation, the light transmitter-receiver module 98a may be attached to a first portion 26a' of the interior surface 26' of the front assembly shield 26 that opposingly-faces/is directly opposite the reflector 98b that is attached to a second portion 26b' of the interior surface 26' of the front assembly shield 26. The first portion 26a' of the interior surface 26' of the front assembly shield 26 may be referred to as a proximal/trailing portion of the front assembly shield 26 whereas the second portion 26b' of the interior surface 26' of the front assembly shield 26 may be referred to as a distal/leading portion of the front assembly shield 26 in view of the movement, M, of the chassis 10 along the track, TR.

Referring to FIG. 21A, a foreign object, FO, is shown proximate, but not in contact with an exterior surface 26" of the front assembly shield 26. In FIG. 21A, the light transmitter-receiver module 98a directs a light beam, LB, from the trailing portion 26a' of the interior surface 26' of the front assembly shield 26 toward the distal portion 26b' of the interior surface 26' of the front assembly 26 that includes the reflector 98b; the reflector 98b reflects the light beam, LB, from the distal portion 26b' of the interior surface 26' of the front assembly 26 back to the light transmitter-receiver module 98a that is positioned upon the trailing portion 26a' of the interior surface 26' of the front assembly shield 26 such that the light transmitter-receiver module 98a is able to receive the light beam, LB.

Referring to FIG. 21BA, the foreign object, FO, is shown in contact with the exterior surface 26" of the front assembly shield 26. As a result of the foreign object, FO, colliding with the exterior surface 26" of the front assembly shield 26, the reflector 98b is no longer aligned with the light transmitter-receiver module 98a (i.e., a predetermined reflection angle of the reflector 98b that would otherwise reflect the light beam, LB, back to the light transmitter-receiver module 98a is adjusted as a result of the foreign object colliding with the front assembly shield 26).

With continued reference to FIG. 21B, the light transmitter-receiver module 98a directs the light beam, LB, from the trailing portion 26a' of the interior surface 26' of the front assembly shield 26 toward the distal portion 26b' of the interior surface 26' of the front assembly 26 that includes the reflector 98b. Even with the predetermined reflection angle of the reflector 98 being adjusted by the foreign object, FO, the reflector 98b still attempts to reflect the light beam, LB, from the distal portion 26b' of the interior surface 26' of the front assembly 26 back to the light transmitter-receiver module 98a that is positioned upon the trailing portion 26a' of the interior surface 26' of the front assembly shield 26. However, because the predetermined reflection angle has been upset by the foreign object, FO, the light transmitter-receiver module 98a is not able to receive the reflected light beam, LB, from the reflector 98b. Thus, as a result of the foreign object, FO, colliding with the exterior surface 26" of the front assembly shield 26, the reflector 98b is no longer aligned with the light transmitter-receiver module 98a, and, therefore, the reflector 98b is not able to reflect the light beam, LB, toward the light transmitter-receiver module 98a such that the light transmitter-receiver module 98a is able to otherwise receive/"see" the light beam, LB.

Functionally, the foreign object crash detection sensor 98 may sense an occurrence of a foreign object, FO, crashing-into/impacting the chassis 10. The foreign object, FO, may include, for example, an object that inhibits movement, M, of the chassis 10 along the track, TR. If, upon detection of an impact of the foreign object, FO, with the chassis 10, by the foreign object crash detection sensor 98, the foreign object crash detection sensor 98 may communicate an interruption of the receipt of the light beam, LB, at the light transmitter-receiver module 98a with one or more of the first enclosure 20a and the second enclosure 20b, which may contain, for example, a controller. Referring to FIG. 5B, the foreign object crash detection sensor 98 is communicatively-coupled to the controller that may be disposed within one or more of the first enclosure 20a and the second enclosure 20b; once a signal indicative of foreign object crash detection has been communicated to the controller, the controller may send an instruction signal to, for example, the motor 12f in order to cause the motor 12f to cease rotation of the wheel $W_{12b'}$; alternatively, for example, once a signal indicative of foreign object crash detection has been communicated to the controller, the controller may send an instruction signal to, for example, a brake connected to, for example, the wheels $W_{12b'}$, $W_{12b''}$ of the front assembly 12 for ceasing movement, M (see, e.g., FIG. 21A), of the chassis 10 as seen in, for example, FIG. 21B. When movement of the chassis 10 according to the direction of the arrow, M, is ceased, the foreign object, FO, may be removed such that the chassis 10 may be permitted to subsequently move, M, along the track, TR.

Figure 22C:
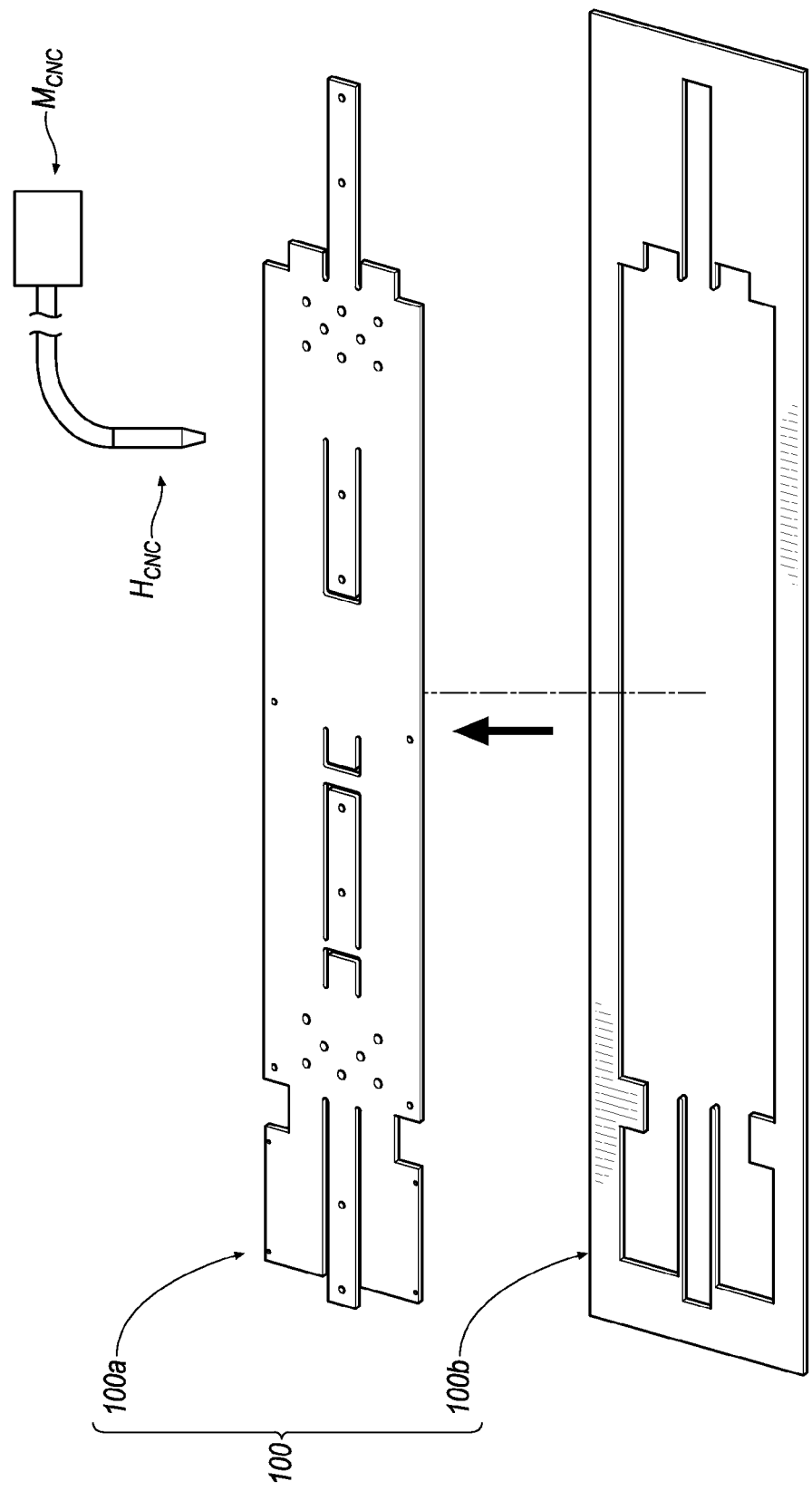
FIG. 22C illustrates the material blank separated to include a scrap portion and a non-scrap portion in accordance with an exemplary embodiment of the invention.

Referring to FIG. 22A, a blank of material is shown generally at 100. The blank of material 100 may include any type of material such as, for example, metal. A computer numerical control cutter machine, $M_{CNC}$, that controls/drives movement of a CNC cutter head, $H_{CNC}$, is also shown at FIG. 22A according to an embodiment. Referring to FIG. 22B, the CNC cutter head, $H_{CNC}$, may utilize, for example, water, a laser, plasma, or the like in order to cut/modify the blank of material 100. Referring to FIG. 22C, once the CNC cutter head, $H_{CNC}$, has finished conducting work upon the blank of material 100, the blank of material 100 may be separated into a first member 100a and a second member 100b; the first member 100a may be referred to as a CNC-cut workpiece, and, the second member 100b may be referred to as a piece of scrap material that may be recycled or discarded.

Referring to FIG. 22D, the CNC-cut workpiece 100a may then be interfaced with a CNC brake press, $P_{CNC}$. Functionally, the CNC brake press, $P_{CNC}$, may bend one or more portions of the CNC-cut workpiece 100a in order to change a spatial orientation of one or more portions of the CNC-cut workpiece 100a. Once the CNC-brake press, $P_{CNC}$, has finished manipulating the spatial orientation of the CNC-cut workpiece 100a, the CNC-cut workpiece 100a may be removed from the CNC brake press, $P_{CNC}$, and may be thereafter referred to as a CNC-formed component 100a', as seen in, for example, FIG. 22E.

Referring to FIG. 22E, the CNC-formed component 100a' may be any desirable component, such as for example, the base frame member 16a. Although the CNC cutter machine, $M_{CNC}$, and the CNC brake press, $P_{CNC}$, may be utilized to modify the blank of material 100 into the base frame member 16a/100a', the CNC cutter machine, $M_{CNC}$, and the CNC brake press, $P_{CNC}$, may be utilized to modify the blank of material 100 into components other than the base frame member 16a. For example, the CNC cutter machine, $M_{CNC}$, and the CNC brake press, $P_{CNC}$, may be utilized to modify the blank of material 100 into any desirable component, such as, for example, the front frame member 12a, the rear frame member 14a or the like.

Figure 23A:
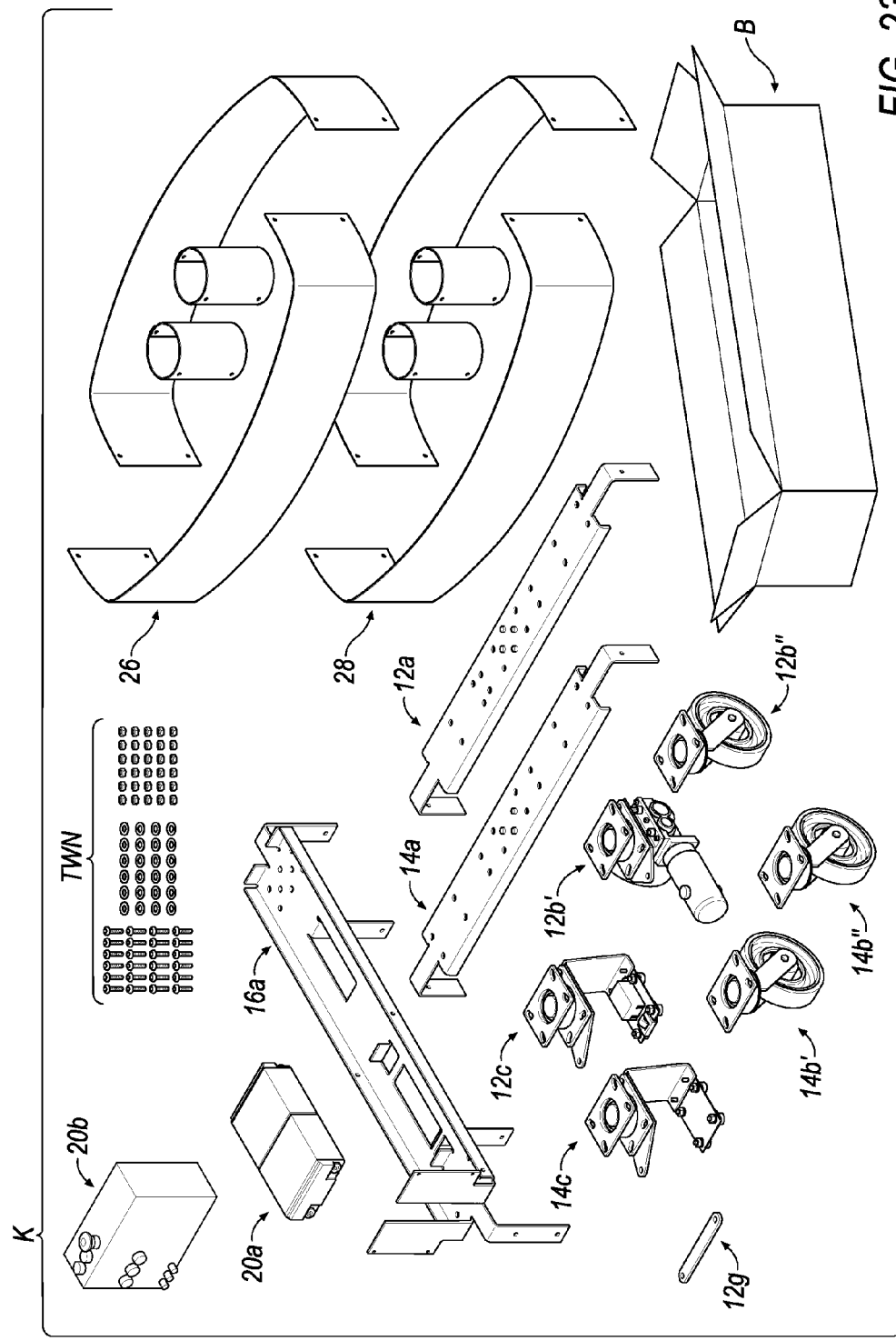
FIG. 23A illustrates a container and a plurality of components defining a kit that may be subsequently joined together for forming the chassis of FIG. 1 in accordance with an exemplary embodiment of the invention.
Figure 23B:
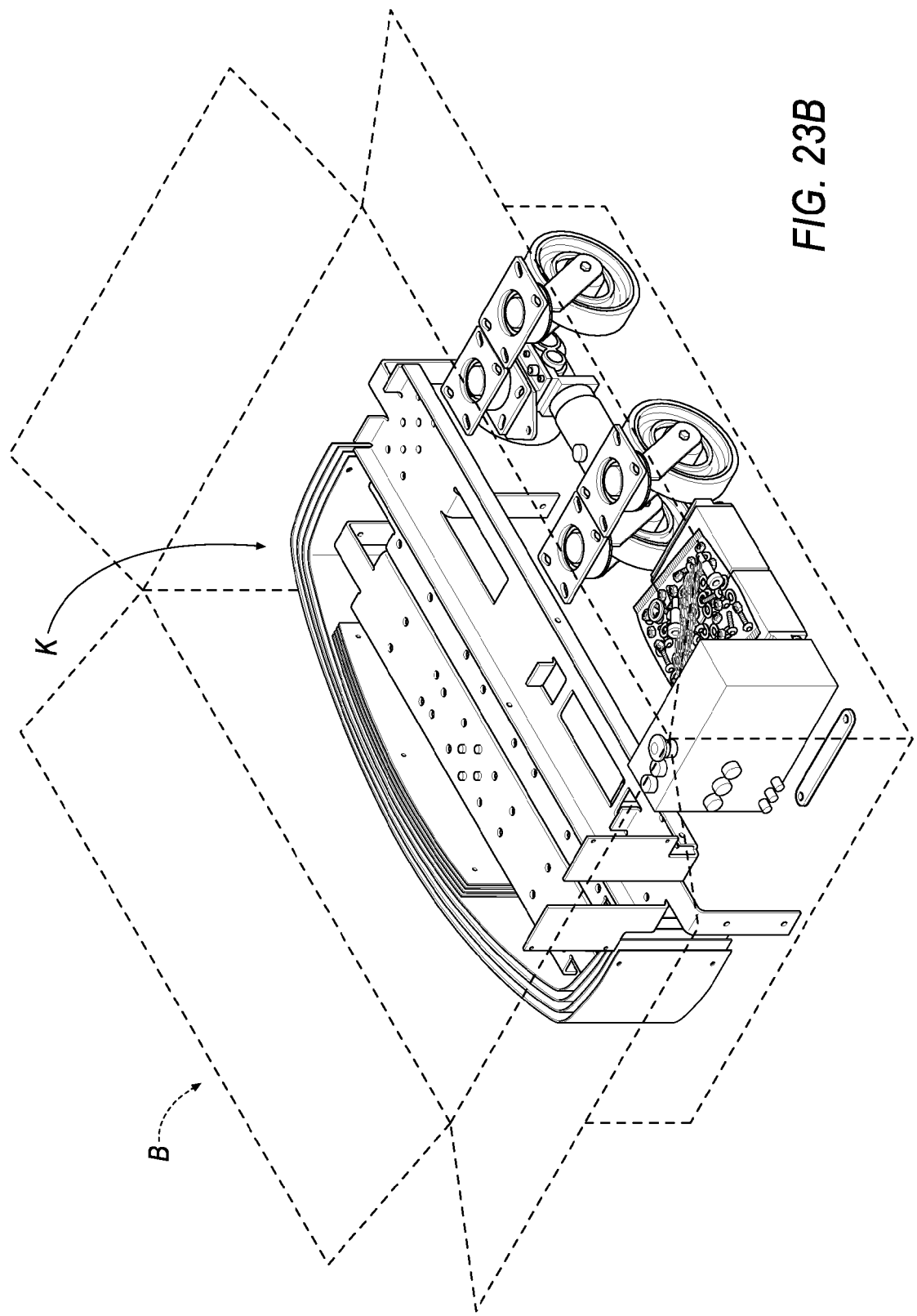
FIG. 23B illustrated the plurality of components defining the kit disposed within the container of FIG. 23A in accordance with an exemplary embodiment of the invention.

Referring to FIG. 23A, a plurality of components that form the sub-assembly 18 (i.e., the front assembly 12, the rear assembly 14 and the intermediate assembly 16) may be collectively referred to as a kit, K. Referring to FIGS. 23A and 23B, the kit, K, may be disposed within a box, B. The box, B, may be shipped to a customer such that the customer may connect the plurality of components of the kit, K, together in order to form the chassis 10.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A chassis front assembly, comprising:
a front frame member;
a first wheel assembly connected to the front frame member by a first bracket, wherein the first wheel assembly includes a first wheel connected to the first bracket;
a second wheel assembly connected to the front frame member by a second bracket, wherein the second wheel assembly includes a second wheel that is connected to the second bracket;
an electrical contact assembly connected to the front frame member by a third bracket; and
a motor disposed within a housing that is connected to the first bracket of the first wheel assembly, wherein the motor is connected to the electrical contact assembly by an electrical conduit, wherein the motor is connected to the first wheel of the first wheel assembly for actively rotating the first wheel of the first wheel assembly, wherein the motor is not connected to the second wheel of the second wheel assembly.

2. The chassis front assembly of claim 1, further comprising:
a drag link that connects the first bracket of the first wheel assembly to the second bracket of the second wheel assembly, wherein rotation of one of the first wheel assembly and the second wheel assembly relative to the front frame member drives rotation of the other of the first wheel assembly and the second wheel assembly relative to the front frame member by way of the drag link that connects the first bracket of the first wheel assembly to the second bracket of the second wheel assembly.

3. The chassis front assembly of claim 1, wherein the second wheel of the second wheel assembly is a caster wheel that casters about a castering axis.

4. The chassis front assembly of claim 1, wherein the electrical contact assembly is interfaceably-coupled to a track including power rails that delivers power to the electrical contact assembly.

5. The chassis front assembly of claim 4, wherein the electrical contact assembly includes:
a base plate connected to the third bracket of the electrical contact assembly,
a track top roller rotatably-connected to the base plate that is engageable with atop surface of the track, and
a plurality of track side rollers rotatably-connected to the base plate that are engageable with a side surface of the track.

6. The chassis front assembly of claim 5, wherein the track top roller of the electrical contact assembly forms:
a plurality of equally-spaced-apart circumferential passages that extend through a thickness of the track top roller, wherein the electrical contact assembly includes
a speed sensor arranged proximate the track top roller.

7. The chassis front assembly of claim 5, wherein the electrical contact assembly includes:
a junction box disposed over a passage formed by the base plate,
a pivotable power rail contact member having a proximal end and a distal end, wherein the proximal end of the pivotable power rail contact member is rotatable-coupled to the base plate and arranged within the passage formed by the base plate, wherein the distal end of the pivotable power rail contact member is engageable with the power rails of the track, wherein the electrical conduit is connected to the proximal end of the pivotable power rail contact member.

8. The chassis front assembly of claim 7, wherein the electrical contact assembly includes:
a biasing member having a proximal end and a distal end, wherein the proximal end of the biasing member is connected to base plate, wherein the distal end of the biasing member is engageable with the distal end of the pivotable power rail contact member for biasing the distal end of the pivotable power rail contact member toward the power rails.

9. The chassis front assembly of claim 1, wherein the front frame member includes:
first and second lateral side flanges that support
a foreign object shield.

10. The chassis front assembly of claim 9, further comprising:
a foreign object crash detection sensor connected to the foreign object shield.

11. The chassis front assembly of claim 10, wherein the foreign object crash detection sensor includes:
a light transmitter-receiver module attached to a first portion of an interior surface of the foreign object shield, and
a reflector attached to a second portion of the interior surface of the foreign object shield, wherein the first portion of an interior surface of the foreign object shield is directly opposite the second portion of the interior surface of the foreign object shield.

12. The chassis front assembly of claim 1, further comprising:
a foreign object detection sensor attached to the front frame member.

13. The chassis front assembly of claim 1, wherein the front frame member of the front assembly includes:
a pair of brackets that are attached to and extend away from an upper surface of the front frame member, and
a pair of load-bearing roller members that are rotatably-coupled to and extend away from an upper surface of the pair of brackets.

14. The chassis front assembly of claim 13, wherein the front frame member includes:
a center pivot bearing that is attached to and extends away from an upper surface of the front frame member.

15. The chassis front assembly of claim 13, wherein, the center pivot bearing includes a body, an inner race secured to the body, an outer race secured to the inner race and a bearing disposed between the inner race and the outer race.

16. The chassis front assembly of claim 1, wherein one or more of the first wheel and the second wheel forms a central passage that receives a hub, wherein the hub forms an elongated, non circular passage, wherein an axle is loosely arranged within but not fixed to the passage that is formed by the hub, wherein the passage includes a geometry that is greater than a geometry of the axle such that the axle is permitted to float within the passage formed by the hub in order to compensate for surface irregularities of an underlying surface encountered by one or more of the first wheel and the second wheel.

17. A chassis rear assembly, comprising:
a rear frame member;
a first wheel assembly connected to the rear frame member by a first bracket, wherein the first wheel assembly includes a first wheel connected to the first bracket, wherein the first wheel of the first wheel assembly is a caster wheel that casters about a castering axis;
a second wheel assembly connected to the rear frame member by a second bracket, wherein the second wheel assembly includes a second wheel that is connected to the second bracket, wherein the second wheel of the second wheel assembly is a caster wheel that casters about a castering axis; and
a track guide assembly connected to the rear frame member by a third bracket.

18. The chassis rear assembly of claim 17, wherein the track guide assembly is interfaceably-coupled to a track.

19. The chassis rear assembly of claim 18, wherein the track guide assembly includes:
a base plate connected to the third bracket of the track guide assembly, and
a plurality of track side rollers rotatably-connected to the base plate that are engageable with a side surface of the track.

20. The chassis rear assembly of claim 17, wherein the rear frame member includes:
first and second lateral side flanges that support a foreign object shield.

21. A chassis, comprising:
a chassis intermediate assembly including
a base frame member;
at least one enclosure supportably-connected to the base frame member, wherein the at least one enclosure includes one or more of a controller, a battery that stores power, one or more status indicators and one or more user input switches, wherein the chassis front assembly of claim 1 is connected to a distal end of the base frame member; and wherein the chassis rear assembly of claim 17 is connected to a proximal end of the base frame member.

22. The chassis of claim 21, wherein the electrical contact assembly of the chassis front assembly is connected to the at least one enclosure for supplying power from the electrical contact assembly to the battery, wherein the battery is connected to the motor of the chassis front assembly for powering the motor.

23. A chassis, comprising:
a chassis intermediate assembly including
a base frame member;
at least one enclosure supportably-connected to the base frame member, wherein the at least one enclosure includes one or more of a controller, a battery that stores power, one or more status indicators and one or more user input switches, wherein the base frame member of the intermediate assembly includes a pair of laterally-projecting flanges that extend away from side rail flanges of the base frame member proximate a distal end of the base frame member; and a lubricity pad attached to a lower surface of each flange of the pair of laterally-projecting flanges.

24. The chassis of claim 23, wherein the chassis front assembly of claim 1 is connected to a distal end of the base frame member, wherein, upon attachment of the base frame member to the front frame member, the pair of load-bearing roller members of the chassis front assembly directly engage the pad that is attached to the lower surface of each flange of the pair of laterally-projecting flanges.

25. The chassis of claim 24, wherein the base frame member forms a passage that receives the center pivot bearing such that the base frame member to is permitted to be disposed upon and be supported by the center pivot bearing of the front frame member.

* * * * *

UNITED STATES PATENT AND TRADEMARK OFFICE
CERTIFICATE OF CORRECTION

| | | |
|---|---|---|
| PATENT NO. | : 8,910,733 B2 | Page 1 of 1 |
| APPLICATION NO. | : 13/370990 | |
| DATED | : December 16, 2014 | |
| INVENTOR(S) | : Keith Masserang et al. | |

It is certified that error appears in the above-identified patent and that said Letters Patent is hereby corrected as shown below:

In The Claims

In Column 17, Claim 5, line 28, "atop" should be changed to -- a top --

Signed and Sealed this
Seventeenth Day of March, 2015

Michelle K. Lee
*Director of the United States Patent and Trademark Office*